United States Patent

Misaka

[11] Patent Number: 5,859,729
[45] Date of Patent: Jan. 12, 1999

[54] ZOOM LENS DEVICE WITH FOUR LENS UNIT

[75] Inventor: Makoto Misaka, Yokohama, Japan

[73] Assignee: Canon Kabushiki Kaisha, Tokyo, Japan

[21] Appl. No.: 775,127

[22] Filed: Dec. 31, 1996

[30] Foreign Application Priority Data

Jan. 6, 1996 [JP] Japan ................................. 8-017140

[51] Int. Cl.⁶ .................................................. G02B 15/14
[52] U.S. Cl. .......................................... 359/686; 359/687
[58] Field of Search .................................. 359/683, 686, 359/687

[56] References Cited

U.S. PATENT DOCUMENTS

| | | |
|---|---|---|
| 4,240,700 | 12/1980 | Ogawa et al. . |
| 4,629,294 | 12/1986 | Tanaka et al. ............................ 359/687 |
| 4,632,519 | 12/1986 | Takahashi . |
| 4,634,236 | 1/1987 | Masumoto . |
| 4,639,096 | 1/1987 | Kitagishi et al. ........................ 359/687 |
| 4,673,658 | 6/1987 | Masumoto . |
| 4,701,033 | 10/1987 | Masumoto . |
| 4,708,443 | 11/1987 | Goto et al. ................................. 359/687 |
| 4,720,180 | 1/1988 | Asano et al. . |
| 4,871,239 | 10/1989 | Masumoto et al. . |
| 5,000,551 | 3/1991 | Shibayama . |
| 5,257,135 | 10/1993 | Kohno et al. . |

FOREIGN PATENT DOCUMENTS

| | | |
|---|---|---|
| 54-30855 | 3/1979 | Japan . |
| 57-5012 | 1/1982 | Japan . |
| 57-29024 | 2/1982 | Japan . |
| 58-160913 | 9/1983 | Japan . |
| 60-14213 | 1/1985 | Japan . |
| 60-14214 | 1/1985 | Japan . |
| 60-57814 | 4/1985 | Japan . |
| 60-142319 | 7/1985 | Japan . |
| 61-56315 | 3/1986 | Japan . |
| 62-24213 | 2/1987 | Japan . |
| 62-247316 | 10/1987 | Japan . |
| 63-66522 | 3/1988 | Japan . |
| 1-223410 | 9/1989 | Japan . |
| 1-241513 | 9/1989 | Japan . |
| 3-6507 | 1/1991 | Japan . |
| 4-317019 | 11/1992 | Japan . |
| 4-317020 | 11/1992 | Japan . |
| 4-321007 | 11/1992 | Japan . |

*Primary Examiner*—Scott J. Sugarman
*Attorney, Agent, or Firm*—Fitzpatrick, Cella, Harper & Scinto

[57] ABSTRACT

A zoom lens device including a total of four lens units, which are in order of lens units from the lens unit closest to an object side, a first lens unit having a positive refractive power, a second lens unit having a negative refractive power, a third lens unit having a positive refractive power, and a fourth lens unit having either a positive or negative refractive power, with a stop provided between the second lens unit and the fourth lens unit. The first lens unit comprises two lenses, a positive lens and a negative lens. The second lens unit comprises one or two negative lenses and one positive lens. The third lens unit comprises at least one positive lens and one negative lens. When magnification is being changed from a wide angle end to a telephoto end, the first, third, and fourth lens units are moved toward the object side such that the distance between the first lens unit and second lens unit increases, the distance between the second lens unit and the third lens unit decreases, and the distance between the third lens unit and the fourth lens unit changes. The zoom lens device has a magnification change-over ratio of about 2 to 3.5, a smaller overall length of the lens system, and provides excellent optical performance over the entire magnification change-over range.

57 Claims, 15 Drawing Sheets

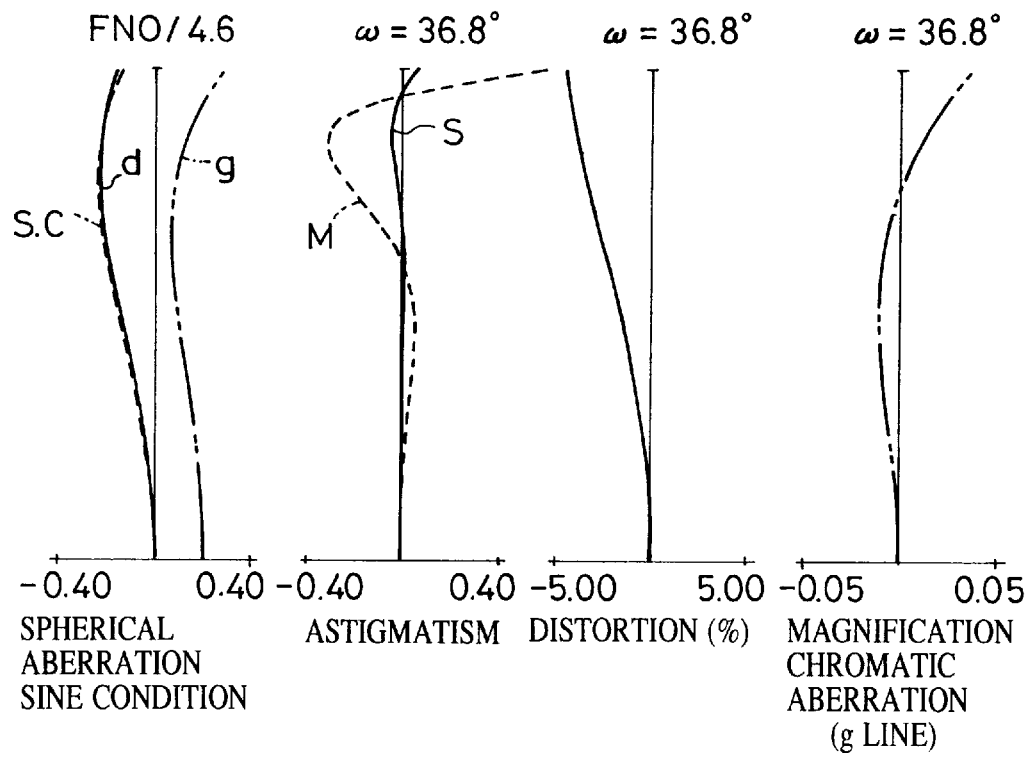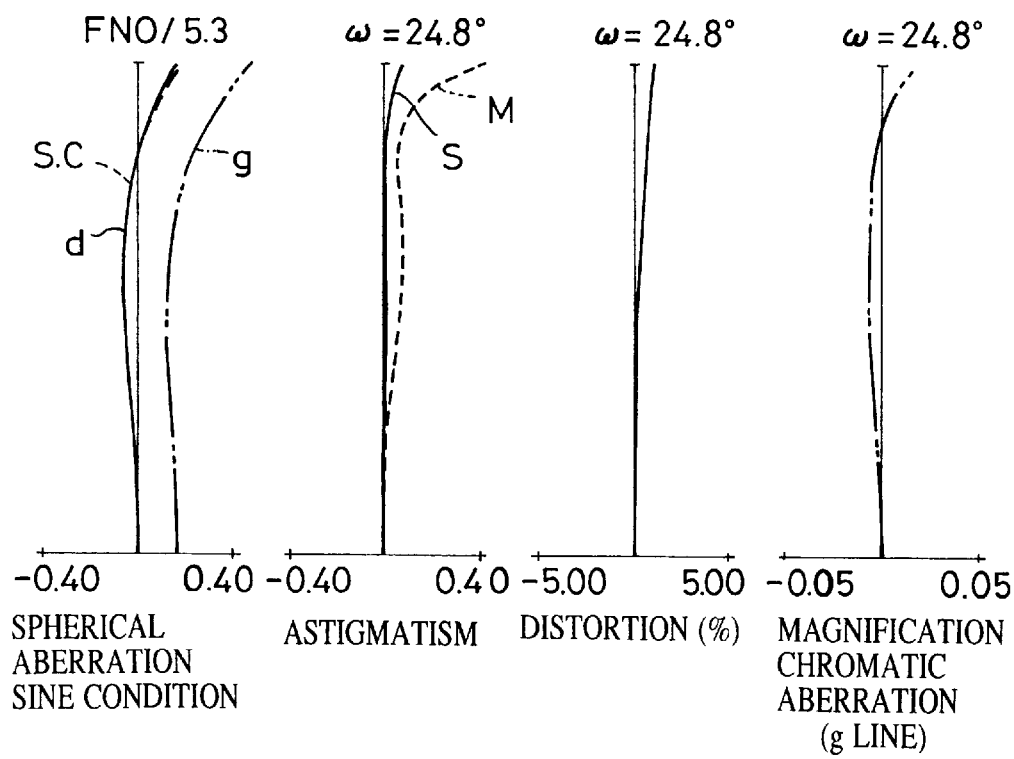

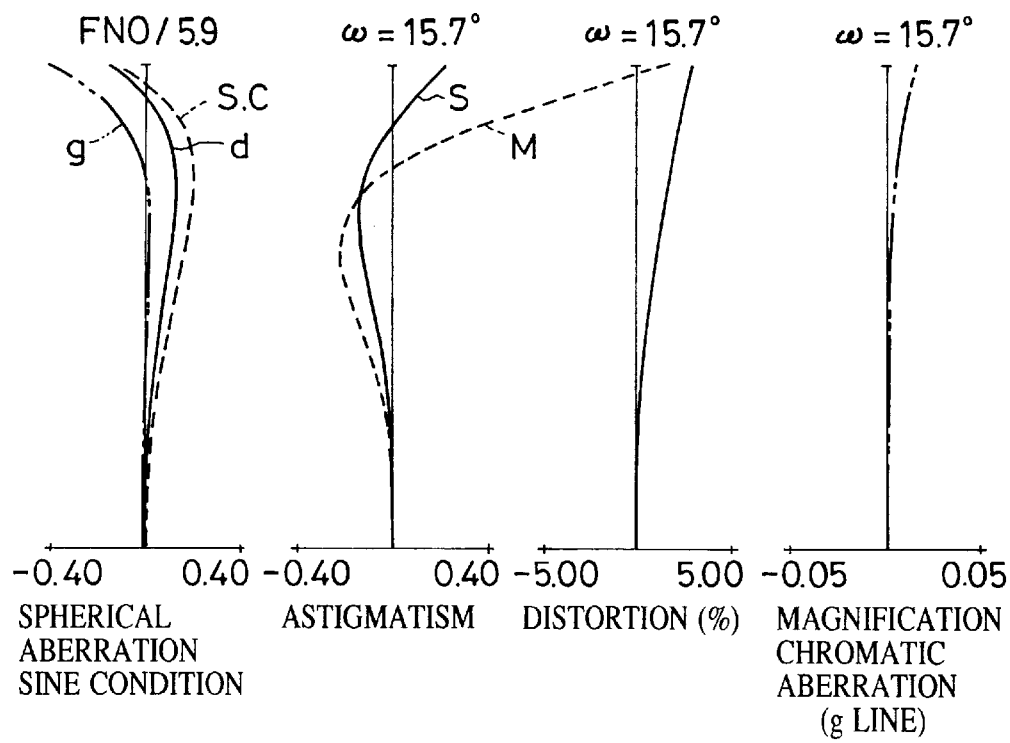
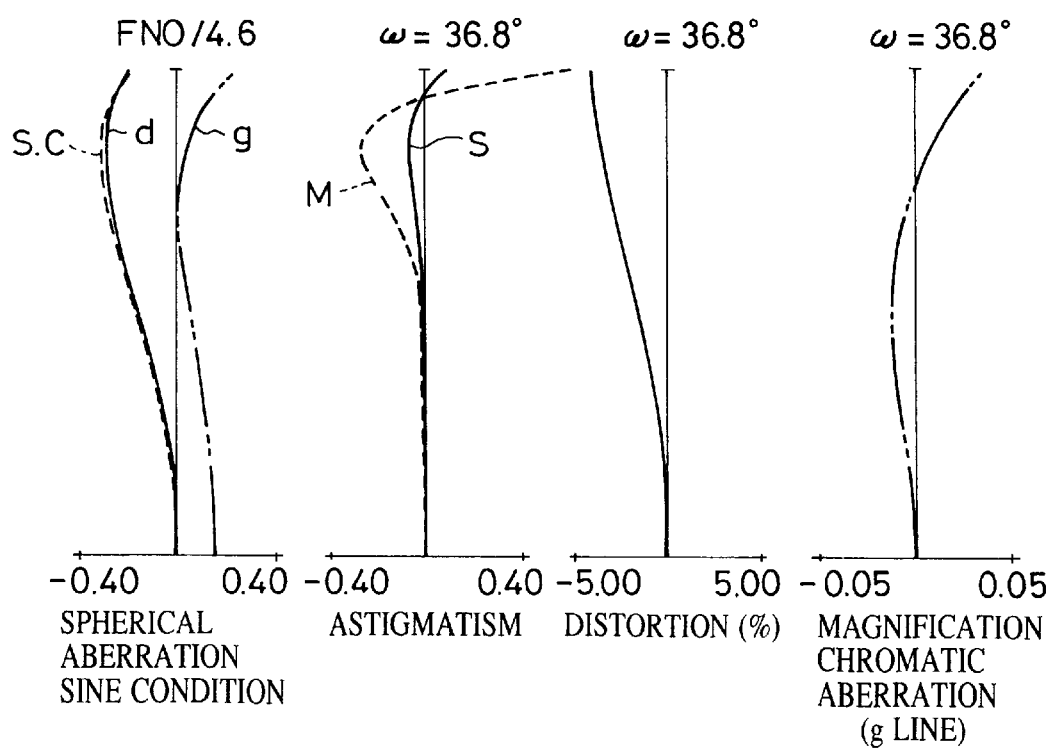

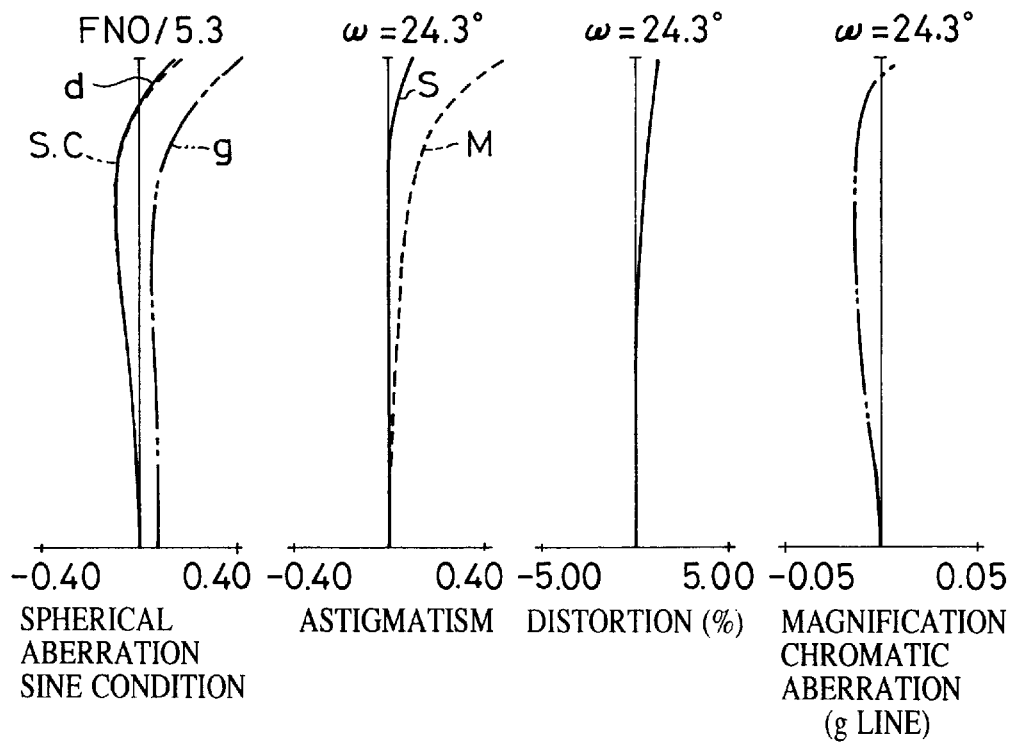
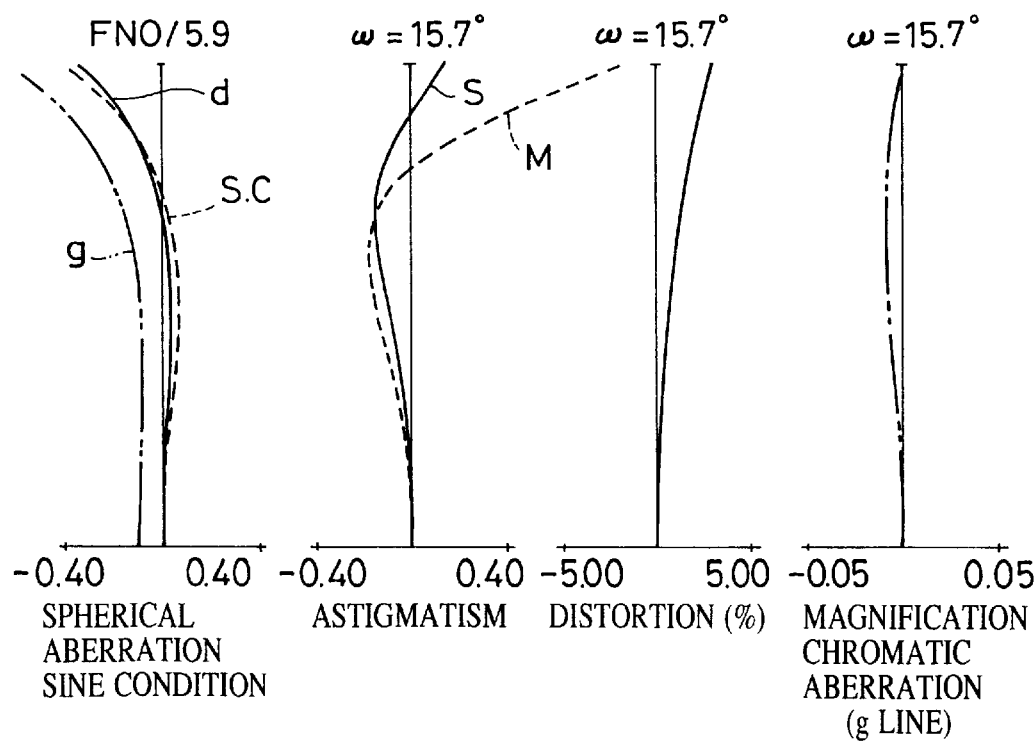

FIG. 14A
FNO/4.4
FIG. 14B
ω = 36.8°
FIG. 14C
ω = 36.8°
FIG. 14D
ω = 36.8°
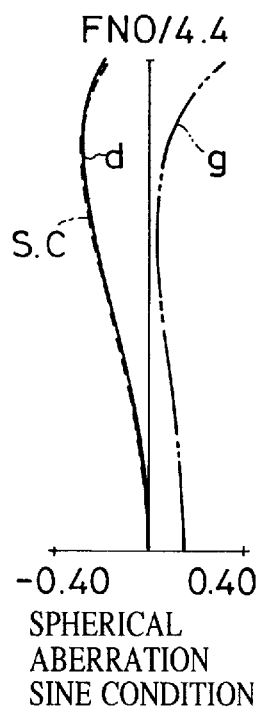
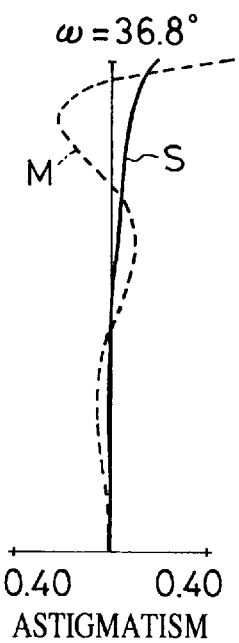
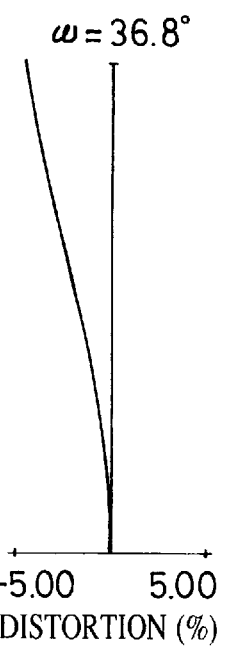
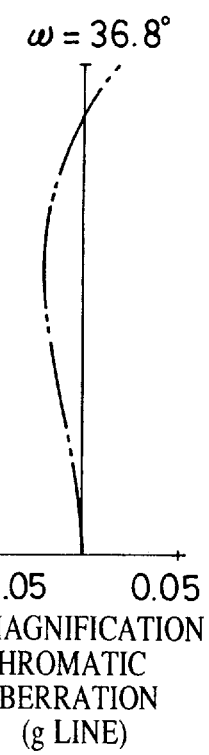
-0.40  0.40
SPHERICAL ABERRATION
SINE CONDITION
-0.40  0.40
ASTIGMATISM
-5.00  5.00
DISTORTION (%)
-0.05  0.05
MAGNIFICATION CHROMATIC ABERRATION
(g LINE)
FIG. 15A
FNO/5.2
FIG. 15B
ω = 24.6°
FIG. 15C
ω = 24.6°
FIG. 15D
ω = 24.6°
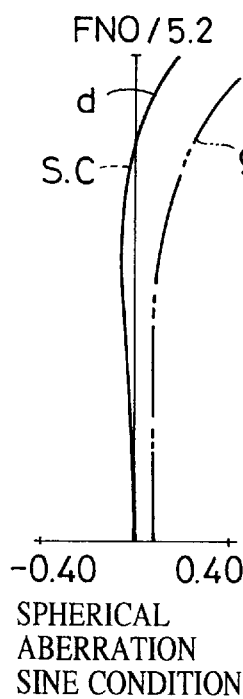
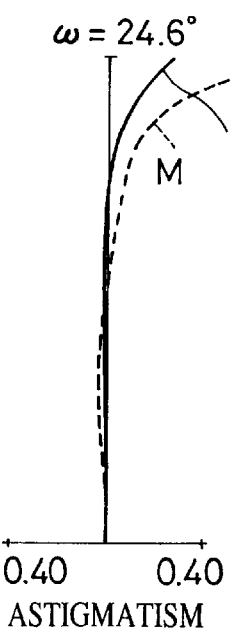
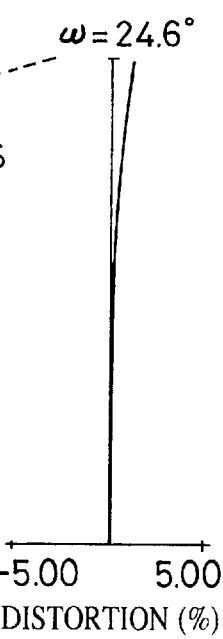
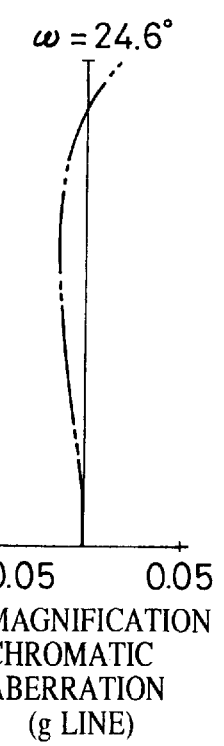
-0.40  0.40
SPHERICAL ABERRATION
SINE CONDITION
-0.40  0.40
ASTIGMATISM
-5.00  5.00
DISTORTION (%)
-0.05  0.05
MAGNIFICATION CHROMATIC ABERRATION
(g LINE)

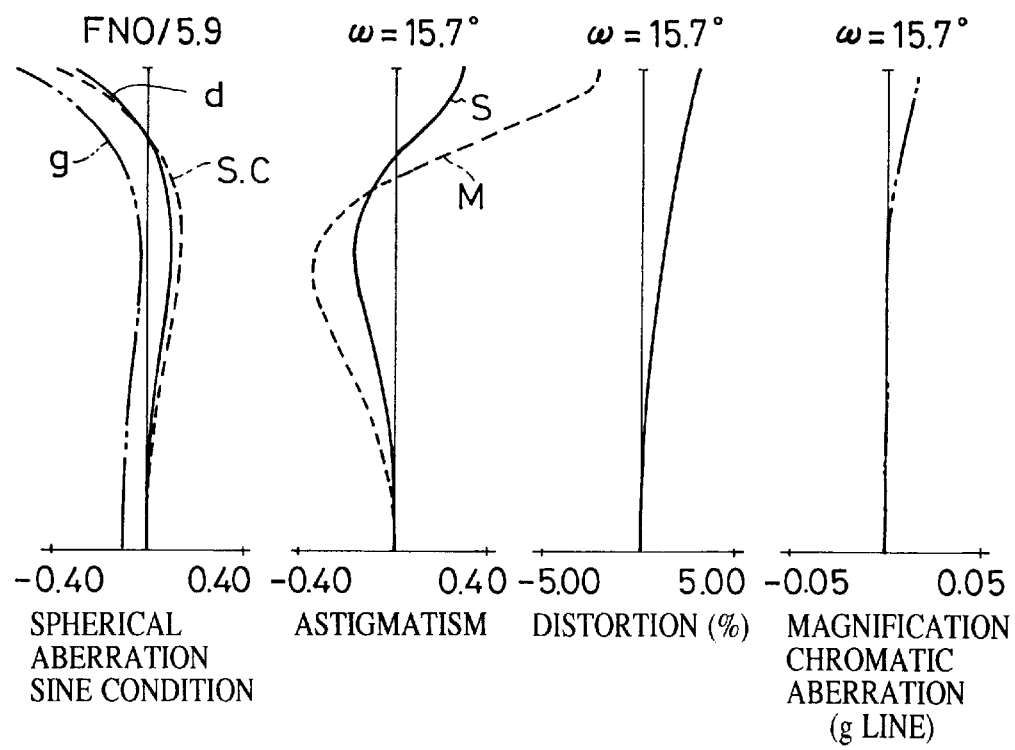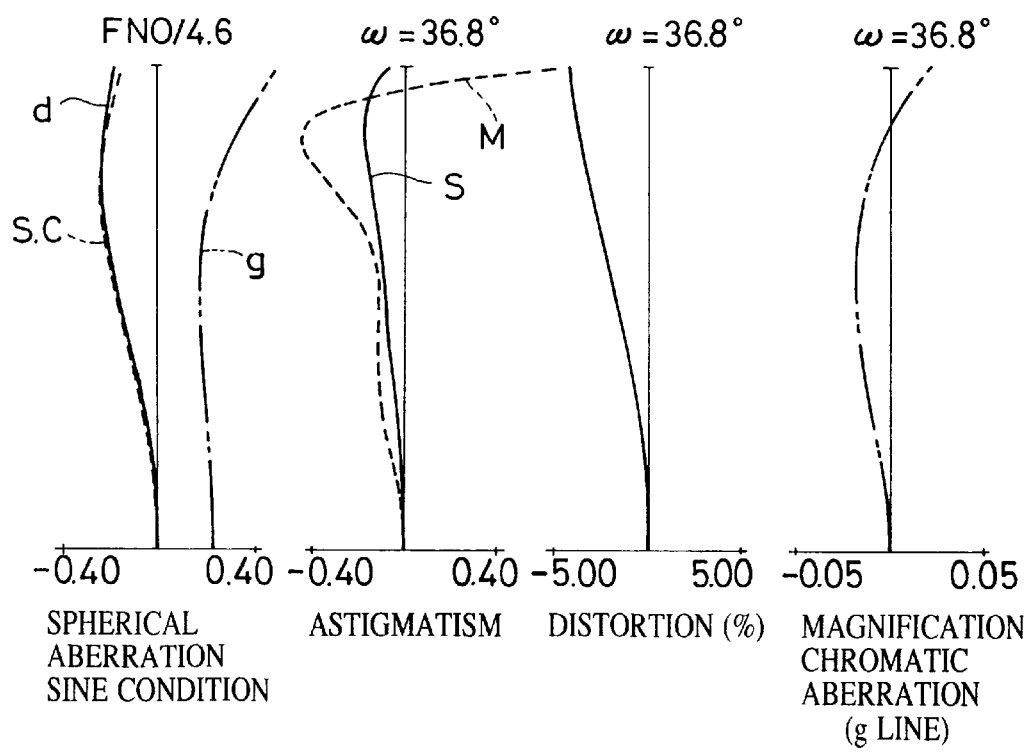

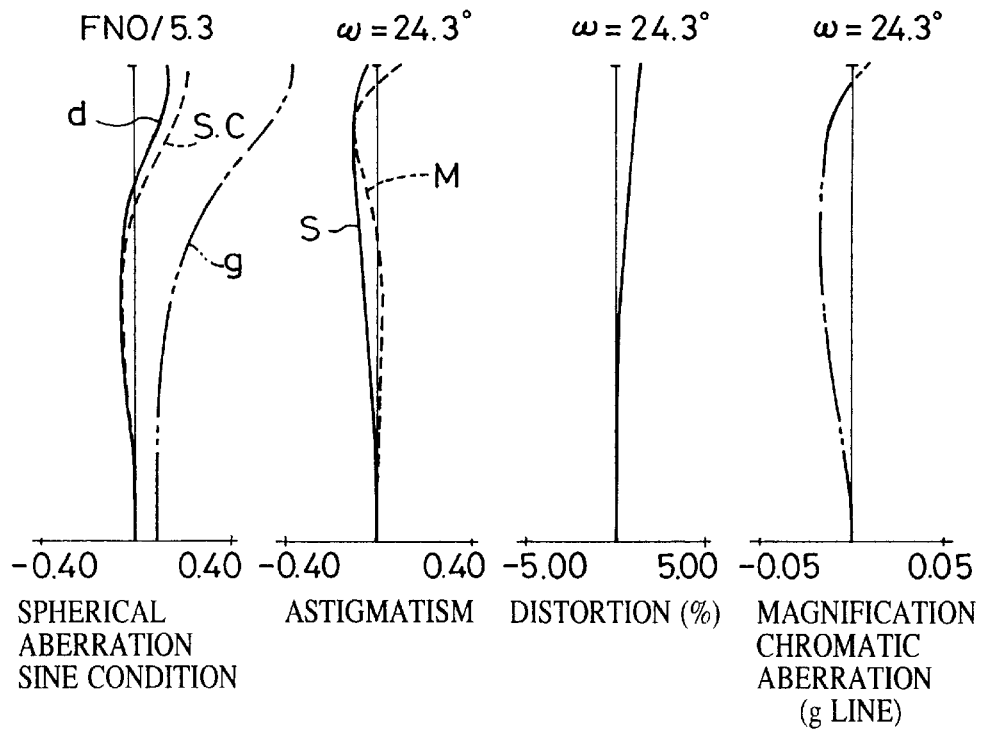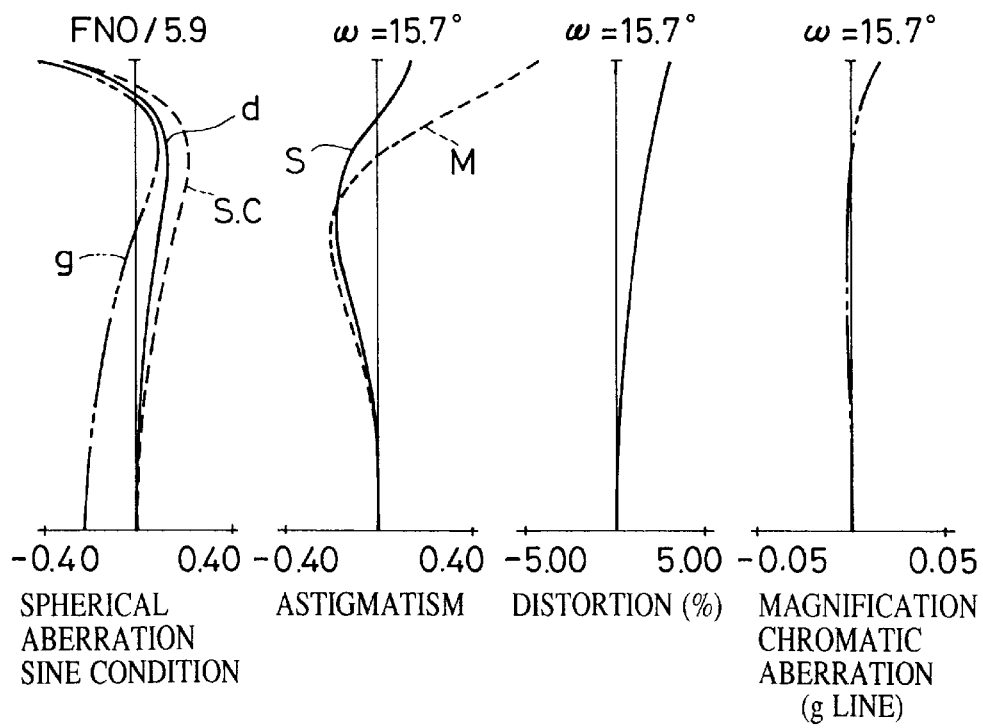

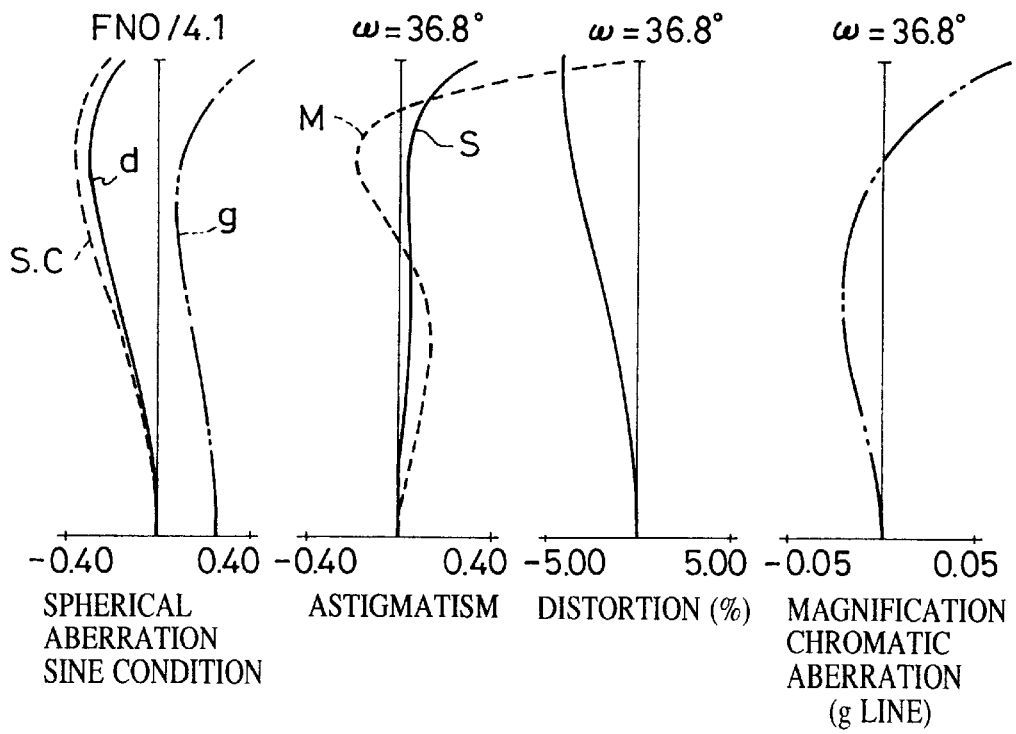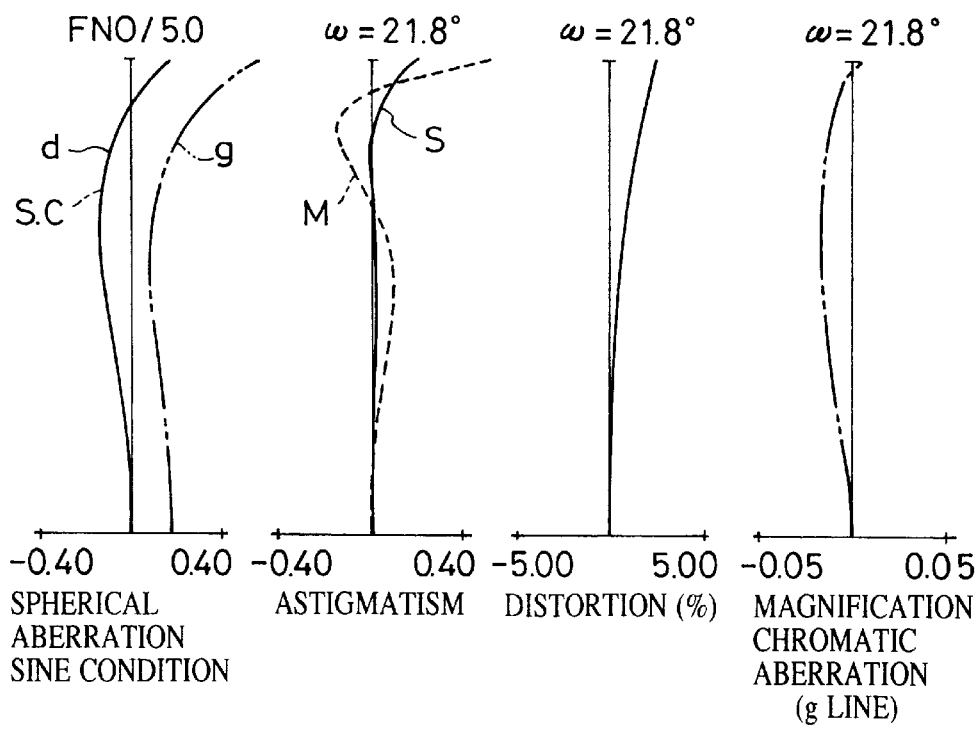

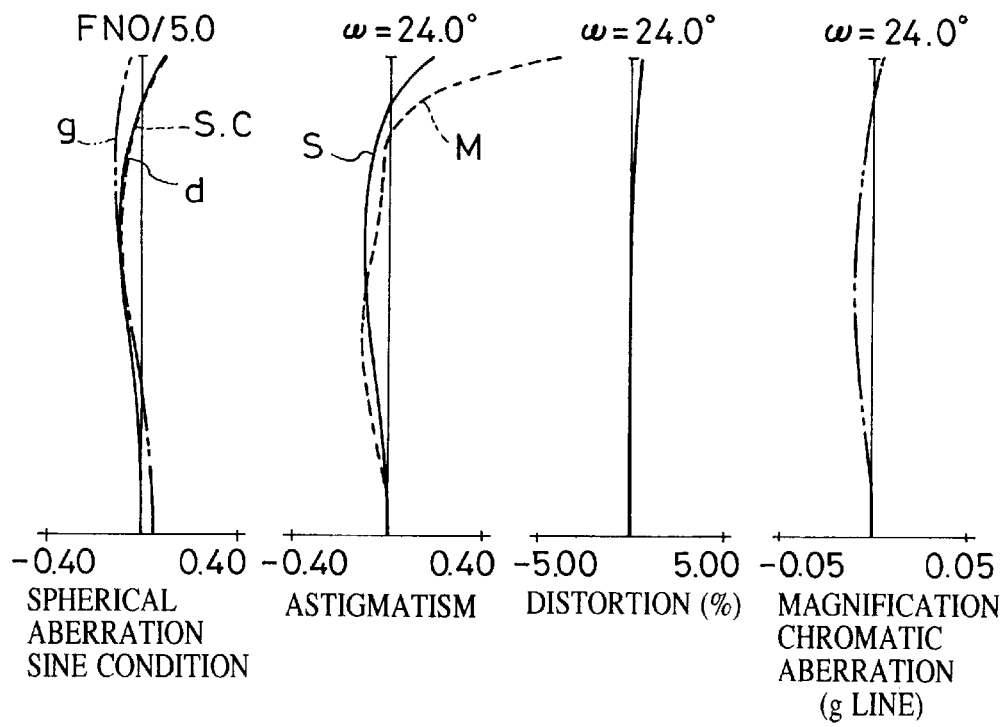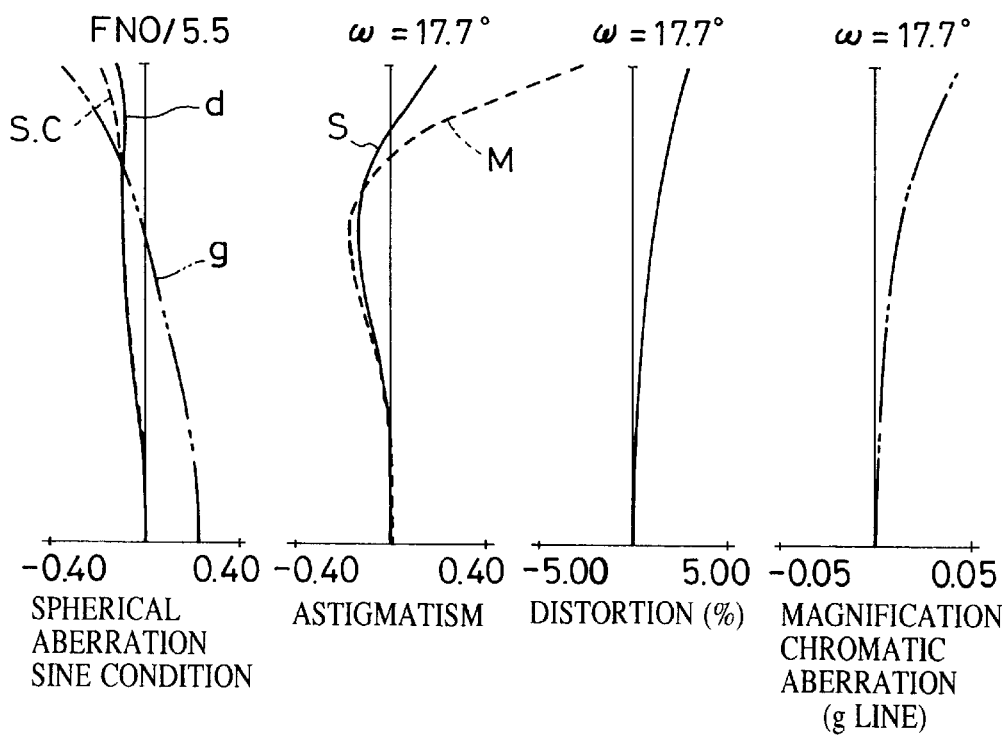

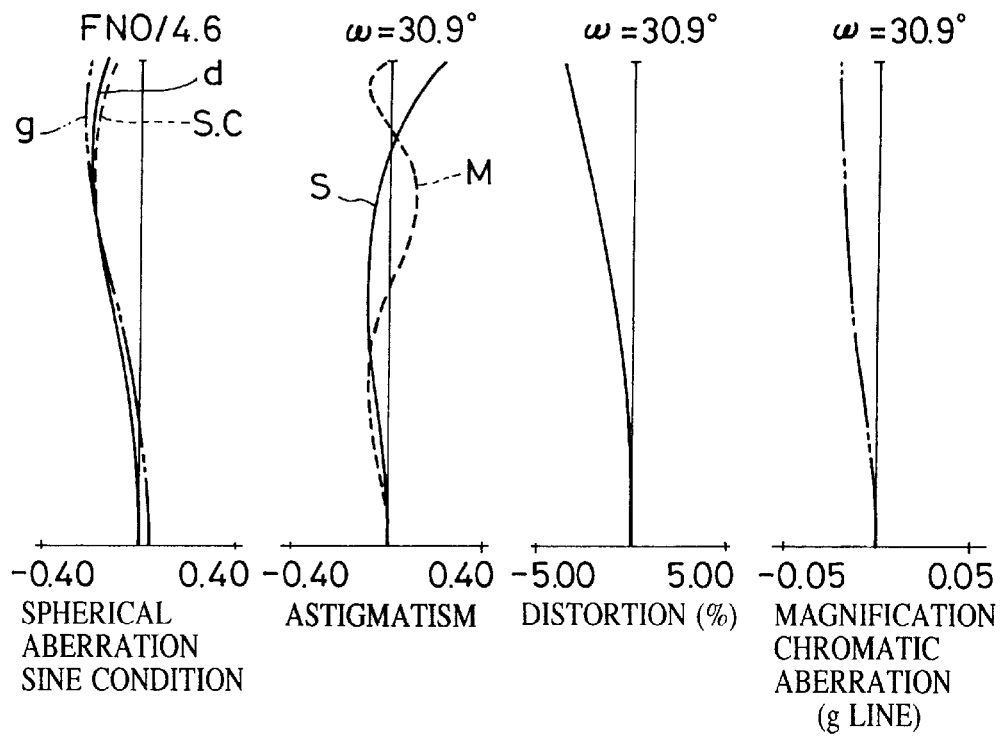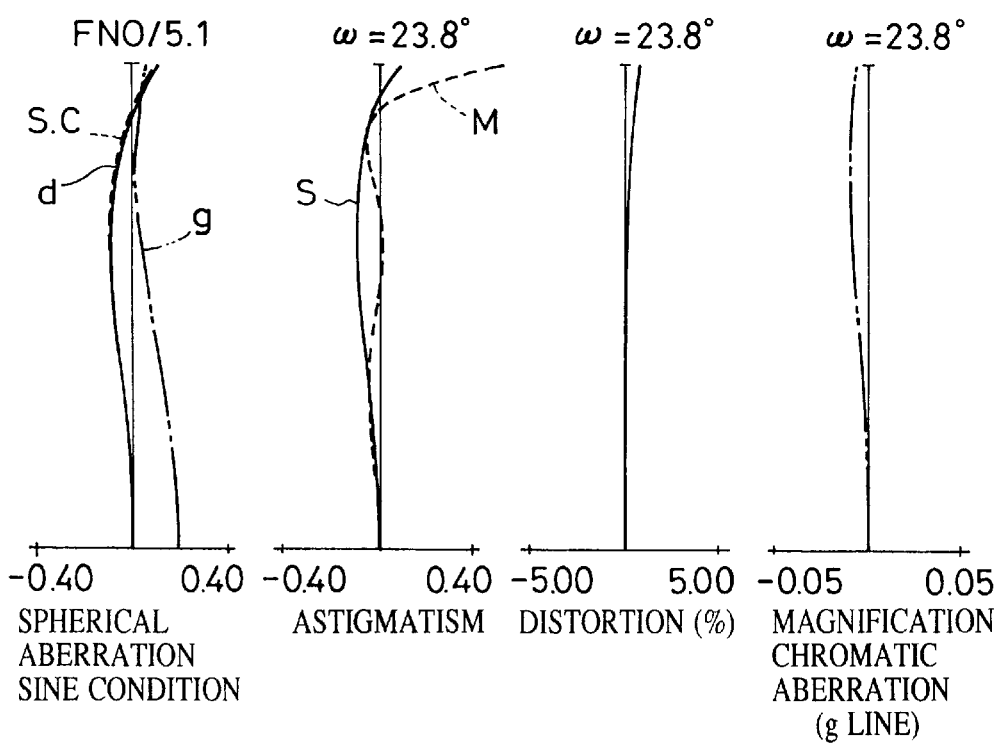

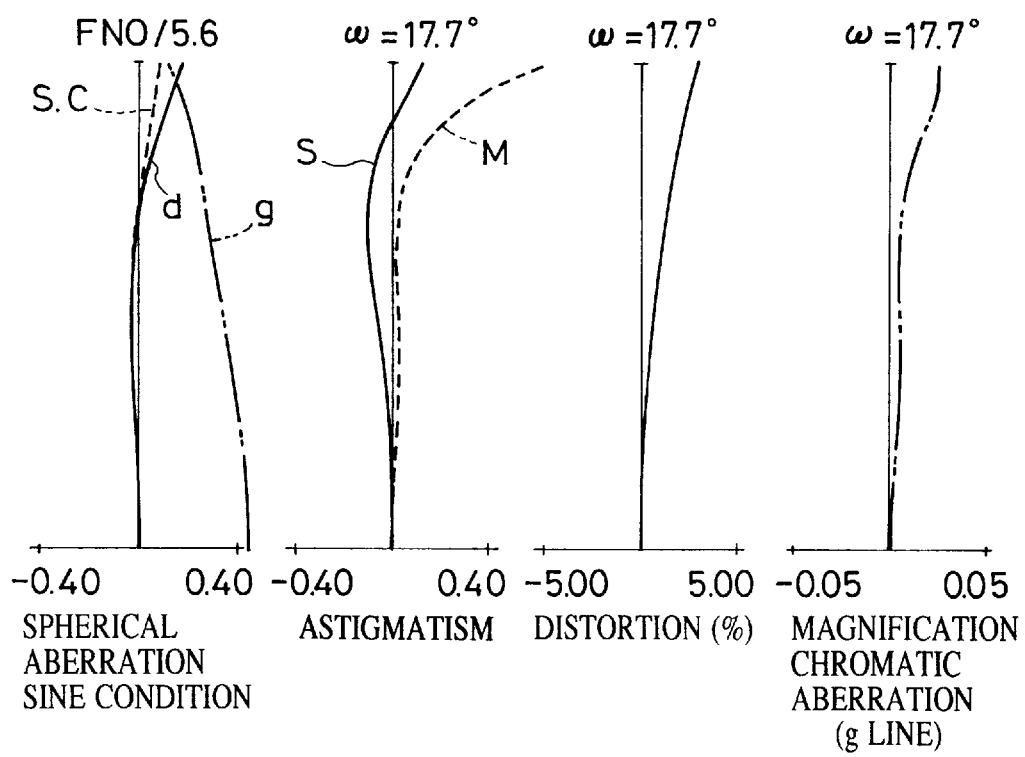

ZOOM LENS DEVICE WITH FOUR LENS UNIT

BACKGROUND OF THE INVENTION

1. Field of the Invention

The present invention relates to a zoom lens device, comprising a total of four lens units, which is suitable for use in a single-lens reflex camera, a lens shutter camera, a video camera, or the like, and, more particularly, to a zoom lens device having a shooting angle of view of about 60 to 75 degrees at a wide angle end, and a magnification change-over ratio of about 2 to 3.5, wherein each lens unit is properly constructed in order to simplify the lens construction, properly correct aberrations, and decrease the overall length (measured from a surface of a first lens unit to an image plane) of the lens device.

2. Description of the Related Art

Recently, smaller single-lens reflex cameras, lens shutter cameras, video cameras, or the like have caused a demand for lighter photographic lenses having a shorter overall length.

For example, Japanese Patent Unexamined Publication Nos. 54-30855, 57-5012, 57-29024, 60-57814, 61-56315, 4-317019, 4-317020, and 4-321007 disclose zoom lens devices comprising three lens units in order to reduce the overall size of the lens system. The lens unit closest to an object side has a positive refractive power. The second closest lens unit has a negative refractive power. The lens unit furthest from the object side has a positive refractive power.

Japanese Patent Unexamined Publication Nos. 60-14213 and 60-14214 disclose zoom lens devices with a shooting angle of view of about 60 degrees at the wide angle end, and a magnification change-over ratio of about 3 to 6. The zoom lens device comprises four lens units, in which the lens unit closest to the object side has a positive refractive power, the next closest lens unit has a negative refractive power, the third closest lens unit has a positive refractive power, and the lens unit furthest from the object side has a positive refractive power.

Japanese Patent Unexamined Publication Nos. 62-247316 and 62-24213 disclose zoom lens devices comprising four lens units. They are in order of lens units from the lens closest to the object side, a first lens unit having a positive refractive power, a second lens unit having a negative refractive power, a third lens unit having a positive refractive power, and a fourth lens unit having a positive refractive power. Magnification changes are performed by moving the second lens unit, while variations in an image plane which occur as the magnification changes are corrected and focusing is performed by moving the fourth lens unit.

Japanese Patent Unexamined Publication No. 58-160913 discloses a zoom lens device comprising four lens units. They are in order of lens units from the lens unit closest to the object side, a first lens unit having a positive refractive power, a second lens unit having a negative refractive power, a third lens unit having a positive refractive power, and a fourth lens unit having a positive refractive power. Magnification changes are performed by moving the first and second lens units, while variations in an image plane which occur as the magnification changes are corrected by moving the fourth lens unit.

Japanese Patent Unexamined Publication No. 63-66522 discloses a zoom lens device comprising four lens units which are in order of lens units from the lens unit closest to the object, a first lens unit having a positive refractive power, a second lens unit having a negative refractive power, a third lens unit having a positive refractive power, and a fourth lens unit having a positive refractive power. Magnification changes are performed by moving the first, the third, and the fourth lens units.

Japanese Patent Unexamined Publication No. 3-6507 discloses a zoom lens device comprising four lens units. The lens unit closest to the object side has a positive refractive power. The next closest lens unit has a negative refractive power. The third closest lens unit has a positive refractive power, and the lens unit furthest from the object side has a positive refractive power. Magnification changes are performed by individually moving each of the four lens units.

In general, in zoom lens devices, it is necessary to properly construct each of the lens units in order to reduce the overall size of the lens system, obtain a predetermined magnification change-over ratio, and achieve good optical performance over the entire magnification change-over range. In the zoom lens devices, increasing the refractive power of each lens unit reduces the amount of movement of each lens unit when magnification changes are being performed, thereby reducing the overall length of the lens system. However, merely increasing the refractive power of each lens increases aberration changes which occur as the magnification changes, thus making it difficult to properly correct the aberration changes.

In the zoom lens device proposed in the aforementioned Japanese Patent Unexamined Publication No. 60-57814, a stop is integrally moved with the second lens unit when the magnification is being changed from the wide angle end to the telephoto end, so that changes in the f-number tend to be large. In addition, it is difficult to use this type of zoom lens device as a replacement lens for a single-lens reflex camera, since the back focus is short.

Japanese Patent Unexamined Publication Nos. 60-142319, 61-56315, 1-223410, and 1-241513 disclose telephoto-type zoom lens devices which, however, cannot be used in ordinary shooting, since the focal length at the wide angle side tends to be too long. Even when these types of lenses are transformed into wider angle lenses, it is extremely difficult to correct aberrations and the required back focus cannot be obtained.

Japanese Patent Unexamined Publication Nos. 4-317019, 4-317020, and 4-321007 disclose zoom lens devices comprising basically three lens units so as to use fewer lenses. However, such lenses are not potentially capable as zoom lenses, thus making it necessary to form approximately more than half of the lens surfaces into aspherical surfaces, as a result of which it becomes difficult to manufacture the lenses and costs are increased.

Japanese Patent Unexamined Publication Nos. 60-14213, 62-24213, 63-66522, and 3-6507 disclose zoom lens devices comprising four lens units, which use a large number of lenses to form the overall lens system, and have a long overall length, thereby tending to increase the overall size of the lens system.

SUMMARY OF THE INVENTION

Accordingly, an object of the present invention is to provide a zoom lens device comprising four lens units which are properly constructed, so that the magnification change-over ratio is about 2 to 3.5, the shooting angle of view is wide at about 60 to 75 degrees, the overall length of the lens device is reduced, and excellent optical performance is provided over the entire magnification change-over range.

To this end, according to the present invention, there is provided a zoom lens device comprising a total of four lens units, which are in order of lens units from the lens unit closest to an object side, a first lens unit having a positive refractive power, a second lens unit having a negative refractive power, a third lens unit having a positive refractive power, and a fourth lens unit having either a positive or a negative refractive power, with a stop provided between the second lens unit and the fourth lens unit. The first lens unit comprises two lenses, a positive lens and a negative lens. The second lens unit comprises one or two negative lenses and one positive lens. The third lens unit comprises at least one positive lens and one negative lens. When magnification is being changed from a wide angle end to a telephoto end, the first, third, and fourth lens units are moved toward the object side such that the distance between the first lens unit and the second lens unit increases, the distance between the second lens unit and the third lens unit decreases, and the distance between the third and fourth lens units changes. The zoom lens device satisfies Conditions (1) and (2):

$$1.5 < f1/fw < 4.5 \tag{1}$$

$$0.4 < -f2/fw < 1.2 \tag{2}$$

where fi is the focal length of any one of the aforementioned ith lens units (e.g., f1 is the focal length of the first lens unit and f2 is the focal length of the second lens unit), and fw is the focal length at the wide angle end of the entire lens system.

In view of the foregoing, in one aspect, the present invention relates to a zoom lens device comprising in order of lens units, from object side to image side, a first lens unit having a positive refractive power, the first lens unit comprising a positive lens and a negative lens, a second lens unit having a negative refractive power, the second lens unit comprising one or two negative lenses and a positive lens, a third lens unit having a positive refractive power, the third lens unit comprising a positive lens and a negative lens, and a fourth lens unit having either a positive or negative refractive power, wherein the zoom lens device further comprises a stop disposed between the second lens unit and the fourth lens unit, wherein when magnification is being changed from a wide angle end to a telephoto end, the first lens unit, the third lens unit, and the fourth lens unit are moved toward the object side such that the distance between the first lens unit and the second lens unit increases, the distance between the second lens unit and the third lens unit decreases, and the distance between the third lens unit and the fourth lens unit changes, and wherein the following conditions are satisfied:

$$1.5 < f1/fw < 4.5$$

$$0.4 < -f2/fw < 1.2$$

where f1 is the focal length of the first lens unit, f2 is the focal length of the second lens unit, and fw is the focal length at the wide angle end of the entire lens system (i.e., zoom lens device).

In another aspect, the present invention relates to a zoom lens device comprising in order of lens units, from object side to image side, a first lens unit having a positive refractive power, the first lens unit comprising a meniscus positive lens and a meniscus negative lens with their convex surfaces facing the object side, a second lens unit having a negative refractive power, the second lens unit comprising a meniscus negative lens having its convex surface facing the object side, a biconcave negative lens, and a meniscus positive lens having its convex surface facing the object side, a third lens unit having a positive refractive power, the third lens unit comprising one of (i) a biconvex positive lens and a negative lens and (ii) a meniscus negative lens with its convex surface facing the object side and a positive lens, and a fourth lens unit having either a positive or negative refractive power and comprising one of (i) a meniscus positive lens having its convex surface facing the image side and (ii) a biconvex positive lens and a biconcave negative lens, wherein the zoom lens device further comprises a stop disposed between the second lens unit and the fourth lens unit, wherein when magnification is being changed from a wide angle end to a telephoto end, the first lens unit, the third lens unit, and the fourth lens unit are moved toward the object side such that the distance between the first lens unit and the second lens unit increases, the distance between the second lens unit and the third lens unit decreases, and the distance between the third lens unit and the fourth lens unit changes, and wherein the following conditions are satisfied:

$$1.5 < f1/fw < 4.5$$

$$0.4 < -f2/fw < 1.2$$

where f1 is the focal length of the first lens unit, fw is the focal length of the second lens unit, and fw is the focal length at the wide angle end of the entire lens system.

In yet another aspect, the present invention relates to a zoom lens device comprising in order of lens units, from object side to image side, a first lens unit having a positive refractive power, the first lens unit comprising a meniscus negative lens and a meniscus positive lens having their convex surfaces facing the object side, a second lens unit having a negative refractive power, the second lens unit comprising a biconcave negative lens and a meniscus positive lens having its convex surface facing the object side, a third lens unit having a positive refractive power, the third lens unit comprising a biconvex positive lens and a meniscus negative lens with its convex surface facing the image side, and a fourth lens unit having either a positive or negative refractive power and comprising a meniscus positive lens having its convex surface facing the image side, wherein the zoom lens device further comprises a stop disposed between the second lens unit and a fourth lens unit, wherein when magnification is being changed from a wide angle end to a telephoto end, the first lens unit, the third lens unit, and the fourth lens unit are moved toward the object side such that the distance between the first lens unit and the second lens unit increases, the distance between the second lens unit and the third lens unit decreases, and the distance between the third lens unit and the fourth lens unit changes, and wherein the following conditions are satisfied:

$$1.5 < f1/fw < 4.5$$

$$0.4 < -f2/fw < 1.2$$

where f1 is the focal length of the first lens unit, f2 is the focal length of the second lens unit, and fw is the focal length at the wide angle end of the entire lens system.

In still yet another aspect, the present invention relates to a zoom lens device comprising in order of lens units, from object side to image side, a first lens unit having a positive refractive power, the first lens unit comprising a positive lens and a meniscus negative lens with its convex surface facing the object side, a second lens unit having a negative refractive power, the second lens unit comprising a biconcave negative lens and a meniscus positive lens having its convex surface facing the object side, a third lens unit having a positive refractive power, the third lens unit comprising a biconvex positive lens and a meniscus negative lens with its convex surface facing the image side, and a fourth lens unit having either a positive or negative refractive power and comprising a meniscus positive lens having its convex surface facing the image side, wherein the zoom lens device further comprises a stop disposed between the second lens unit and the fourth lens unit, wherein when magnification is being changed from a wide angle end to a telephoto end, the first lens unit, the third lens unit, and the fourth lens unit are moved toward the object side such that the distance between the first lens unit and the second lens unit increases, the distance between the second lens unit and the third lens unit decreases, and the distance between the third lens unit and the fourth lens unit changes, and wherein the following conditions are satisfied:

$$1.5 < f1/fw < 4.5$$

$$0.4 < -f2/fw < 1.2$$

where f1 is the focal length of the first lens unit, f2 is the focal length of the second lens unit, and fw is the focal length at the wide angle end of the entire lens system.

These and other aspects, objects, and features of the present invention will become apparent from the following detailed description of preferred embodiments thereof taken in connection with the accompanying drawings.

BRIEF DESCRIPTION OF THE DRAWINGS

FIGS. 8A, 8B, 8C and 8D illustrate diagrams showing the different aberrations at the wide angle end in Numerical Example 1 in accordance with the present invention.

FIGS. 9A, 9B, 9C, and 9D illustrate diagrams showing the different aberrations at an intermediate state between the wide angle end state and the telephoto end state of the lens unit system in Numerical Example 1 in accordance with the present invention.

FIGS. 10A, 10B, 10C, and 10D illustrate diagrams showing the different aberrations at the telephoto end in Numerical Example 1 in accordance with the present invention.

FIGS. 11A, 11B, 11C, and 11D illustrate diagrams showing the different aberrations at the wide angle end in Numerical Example 2 in accordance with the present invention.

FIGS. 12A, 12B, 12C, and 12D illustrate diagrams showing the different aberrations at the intermediate state between the wide angle end state and the telephoto end state of the lens unit system in Numerical Example 2 in accordance with the present invention.

FIGS. 13A, 13B, 13C, and 13D illustrate diagrams showing the different aberrations at the telephoto end in Numerical Example 2 in accordance with the present invention.

FIGS. 14A, 14B, 14C, and 14D illustrate diagrams showing the different aberrations at the wide angle end in Numerical Example 3 in accordance with the present invention.

FIGS. 15A, 15B, 15C, and 15D illustrate diagrams showing the different aberrations at the intermediate state between the wide angle end state and the telephoto end state of the lens unit system in Numerical Example 3 in accordance with the present invention.

FIGS. 16A, 16B, 16C, and 16D illustrate diagrams showing the different aberrations at the telephoto end in Numerical Example 3 in accordance with the present invention.

FIGS. 17A, 17B, 17C, and 17D illustrate diagrams showing the different aberrations at the wide angle end in Numerical Example 4 in accordance with the present invention.

FIGS. 18A, 18B, 18C, and 18D illustrate diagrams showing the different aberrations at the intermediate state between the wide angle end state and the telephoto end state of the lens unit system in Numerical Example 4 in accordance with the present invention.

FIGS. 19A, 19B, 19C, and 19D illustrate diagrams showing the different aberrations at the telephoto end in Numerical Example 4 in accordance with the present invention.

FIGS. 20A, 20B, 20C, and 20D illustrate diagrams showing the different aberrations at the wide angle end in Numerical Example 5 in accordance with the present invention.

FIGS. 21A, 21B, 21C, and 21D illustrate diagrams showing the different aberrations at the intermediate state between the wide angle end state and the telephoto end state of the lens unit system in Numerical Example 5 in accordance with the present invention.

FIGS. 24A, 24B, 24C, and 24D illustrate diagrams showing the different aberrations at the intermediate state between the wide angle end state and the telephoto end state of the lens unit system in Numerical Example 6 in accordance with the present invention.

FIGS. 25A, 25B, 25C, and 25D illustrate diagrams showing the different aberrations at the telephoto end in Numerical Example 6 in accordance with the present invention.

FIGS. 26A, 26B, 26C, and 26D illustrate diagrams showing the different aberrations at the wide angle end in Numerical Example 7 in accordance with the present invention.

FIGS. 27A, 27B, 27C, and 27D illustrate diagrams showing the different aberrations at the intermediate state between the wide angle end state and the telephoto end state of the lens unit system in Numerical Example 7 in accordance with the present invention.

FIGS. 28A, 28B, 28C, and 28D illustrate diagrams showing the different aberrations at the telephoto end in Numerical Example 7 in accordance with the present invention.

DESCRIPTION OF THE PREFERRED EMBODIMENTS

Figure 1:
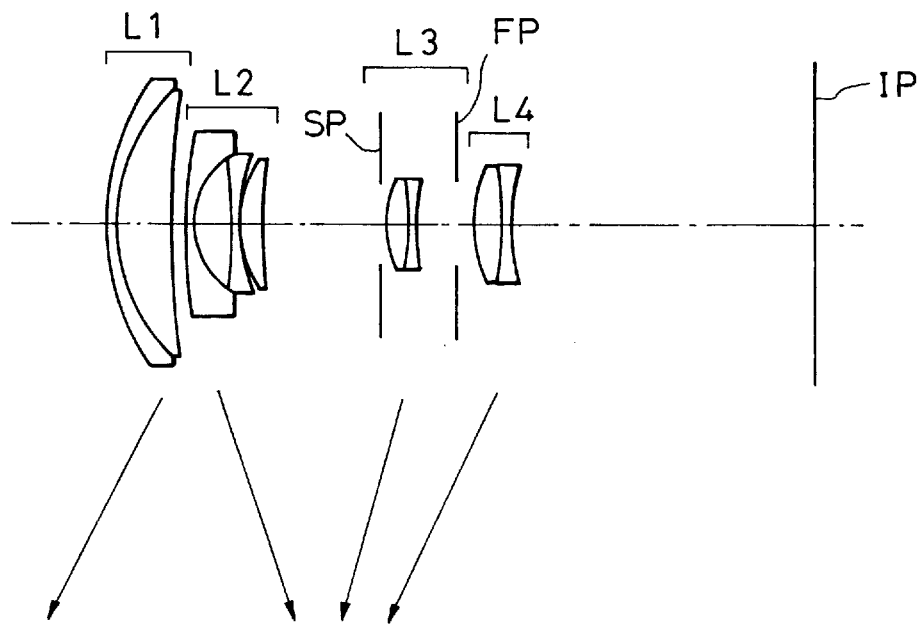
FIG. 1 is a cross section of a lens unit system at a wide angle end in Numerical Example 1 in accordance with the present invention.
Figure 2:
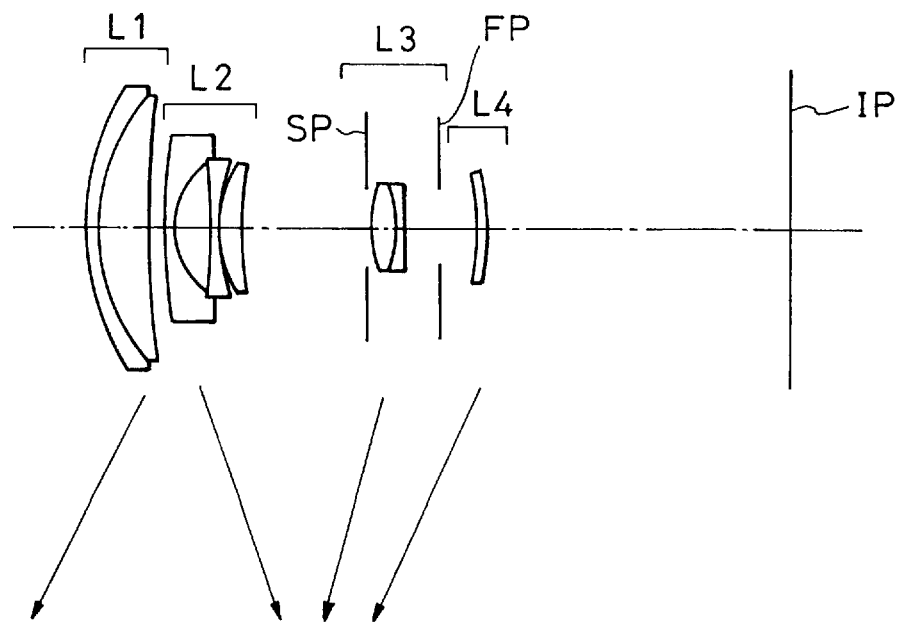
FIG. 2 is a cross section of a lens unit system at a wide angle end in Numerical Example 2 in accordance with the present invention.
Figure 3:
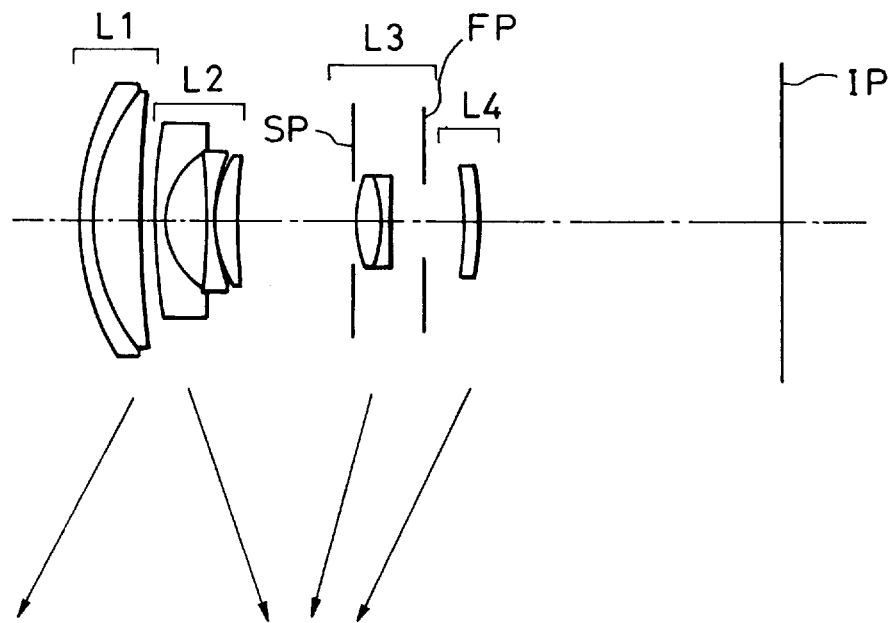
FIG. 3 is a cross section of a lens unit system at a wide angle end in Numerical Example 3 in accordance with the present invention.
Figure 4:
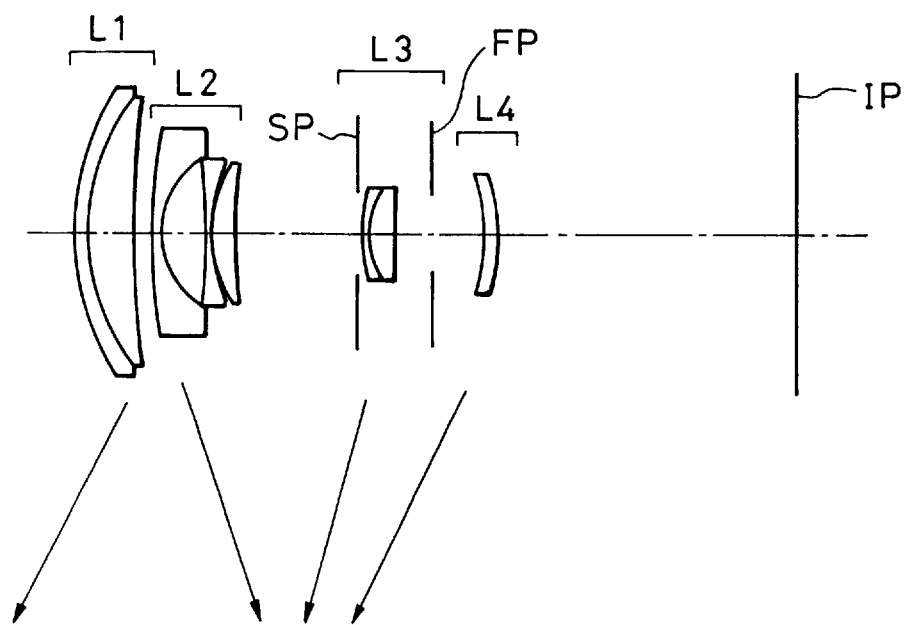
FIG. 4 is a cross section of a lens unit system at a wide angle end in Numerical Example 4 in accordance with the present invention.
Figure 5:
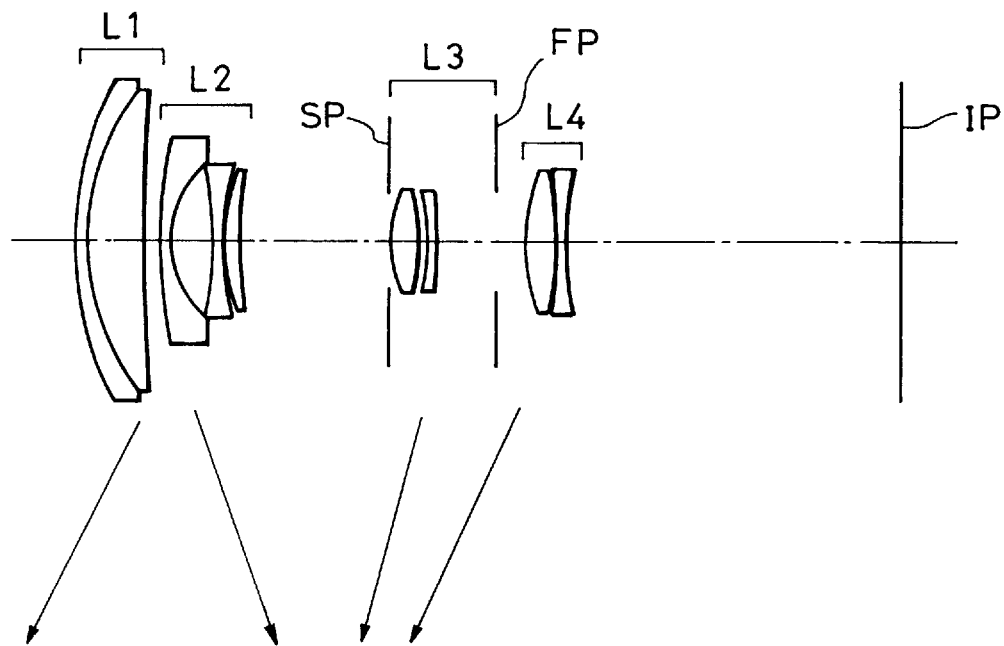
FIG. 5 is a cross section of a lens unit system at a wide angle end in Numerical Example 5 in accordance with the present invention.

FIGS. 1 to 7 are cross sections of lens unit systems at the wide angle end in Numerical Examples 1 to 7, respectively, in accordance with the present invention.

FIGS. 8A–8D, 9A–9D, and 10A–10D illustrate diagrams showing aberrations at the wide angle end, an intermediate state between the wide angle end and the telephoto end, and the telephoto end, respectively, in Numerical Example 1 in accordance with the present invention. FIGS. 11A–11D, 12A–12D, and 13A–13D illustrate diagrams showing aberrations at the wide angle end, an intermediate state between the wide angle end and the telephoto end, and the telephoto end, respectively, in Numerical Example 2 in accordance with the present invention. FIGS. 14A–14D, 15A–15D, and 16A–16D illustrate diagrams showing aberrations at the wide angle end, an intermediate state between the wide angle end and the telephoto end, and the telephoto end, respectively, in Numerical Example 3 in accordance with the present invention. FIGS. 17A–17D, 18A–18D, and 19A–19D illustrate diagrams showing aberrations at the wide angle end, an intermediate state between the wide angle end and the telephoto end, and the telephoto end, respectively, in Numerical Example 4 in accordance with the present invention. FIGS. 20A–20D, 21A–21D, and 22A–22D illustrate diagrams showing aberrations at the wide angle end, an intermediate state between the wide angle end and the telephoto end, and the telephoto end, respectively, in Numerical Example 5 in accordance with the present invention. FIGS. 23A–23D, 24A–24D, and 25A–25D illustrate diagrams showing aberrations at the wide angle end, an intermediate state between the wide angle end and the telephoto end, and the telephoto end, respectively, in Numerical Example 6 in accordance with the present invention. FIGS. 26A–26D, 27A–27D, and 28A–28D illustrate diagrams showing aberrations at the wide angle end, an intermediate state between the wide angle end and the telephoto end, and the telephoto end, respectively, in Numerical Example 7 in accordance with the present invention.

Referring to the figures (e.g., FIGS. 1 through 7), L1 denotes a first lens unit with a positive refractive power, L2 denotes a second lens unit with a negative refractive power, L3 represents a third lens unit with a positive refractive power, L4 denotes a fourth lens unit with a positive refractive power, SP denotes a stop which is disposed between the second lens unit and the fourth lens unit and, in the present invention, forwardly of the third lens unit. FP denotes a flare cut stop which is disposed between the third lens unit and the fourth lens unit. IP denotes the image plane.

In the present embodiment, when magnification changes from the wide angle end to the telephoto end, the first, third, and fourth lens units move toward the object side such that the distance between the first and second lens units is increased, the distance between the second and third lens units is decreased, and the distance between the third and fourth lens units is decreased. The stop SP and the flare cut stop FP move integrally with the third lens unit. Focusing is performed by moving the second lens unit.

In the Numerical Examples 1 to 5 of FIGS. 1 to 5, respectively, the first lens unit L1 comprises two lenses, a meniscus negative lens and a meniscus positive lens. The meniscus negative lens and the meniscus positive lens have their convex surfaces facing the object side. The second lens unit L2 comprises three lenses, a meniscus negative lens, a negative lens, and a meniscus positive lens. The meniscus negative lens has its convex surface facing the object side, the negative lens is a biconcave lens, and the meniscus positive lens has its convex surface facing the object side. The third lens unit L3 comprises two lenses which may be a biconvex positive lens and a negative lens, or a meniscus negative lens with its convex surface facing the object side and a positive lens. The fourth lens unit L4 may comprise one lens which is a meniscus positive lens having its convex surface facing the image side, or two lenses, one of which is a biconvex positive lens and the other of which is a biconcave negative lens.

Figure 6:
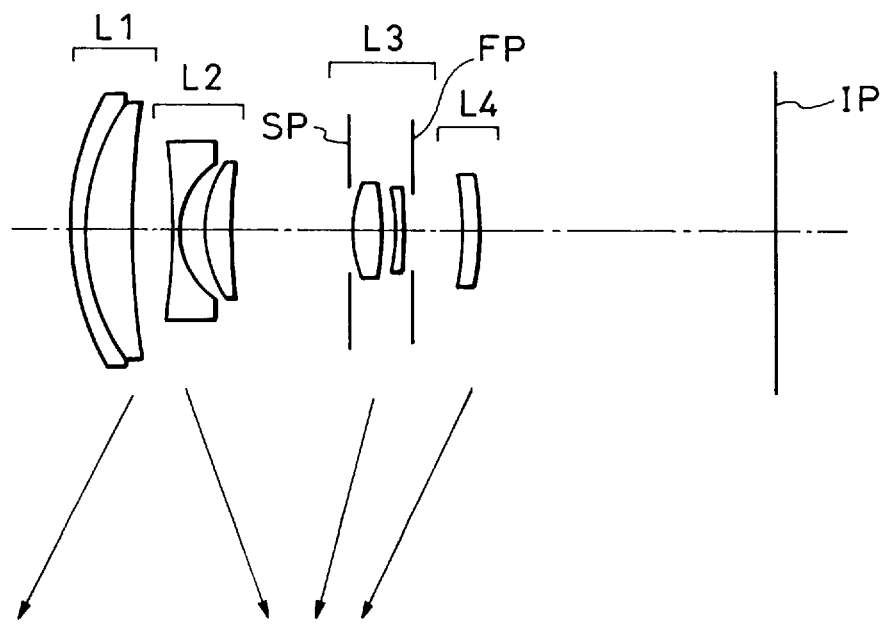
FIG. 6 is a cross section of a lens unit system at a wide angle end in Numerical Example 6 in accordance with the present invention.

In Numerical Example 6 of FIG. 6, the first lens unit L1 comprises two lenses, a meniscus negative lens with its convex surface facing the object side, and a meniscus positive lens with its convex surface facing the object side. The second lens unit comprises two lenses, a biconcave negative lens and a meniscus positive lens with its convex surface facing the object side. The third lens unit comprises two lenses, a biconvex positive lens and a meniscus negative lens with its convex surface facing the image plane side. The fourth lens unit comprises one lens which is a meniscus positive lens having its convex surface facing the image plane side.

Figure 7:
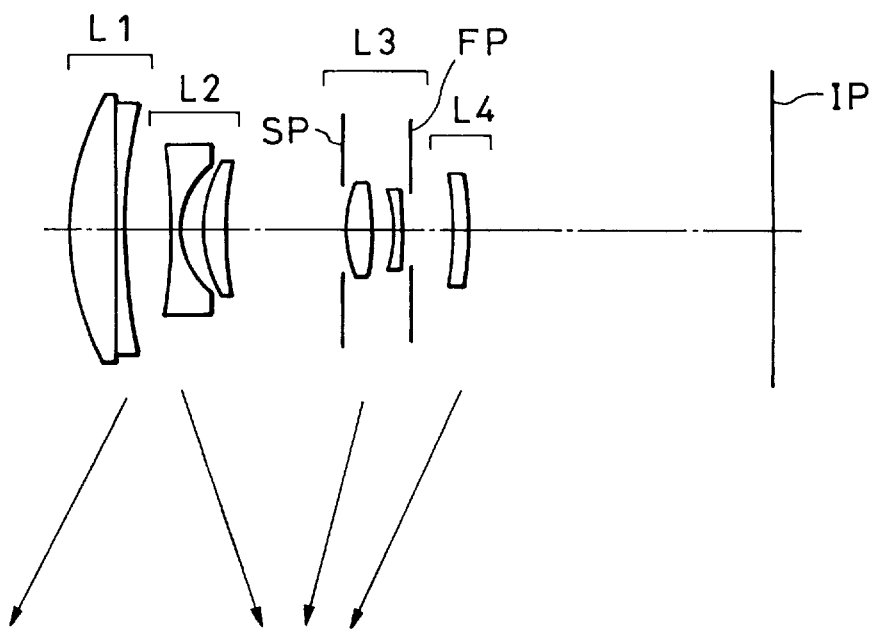
FIG. 7 is a cross section of a lens unit system at a wide angle end in Numerical Example 7 in accordance with the present invention.
Figures 22A, 22B, 22C, 22D:
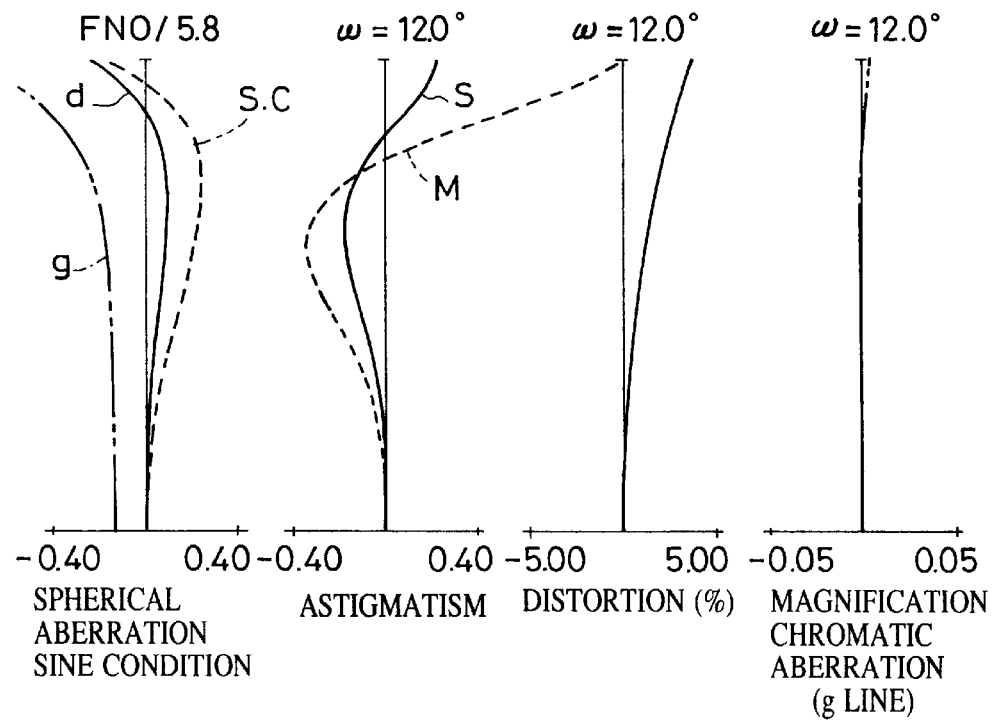
FIGS. 22A, 22B, 22C, and 22D illustrate diagrams showing the different aberrations at the telephoto end in Numerical Example 5 in accordance with the present invention.
Figures 23A, 23B, 23C, 23D:
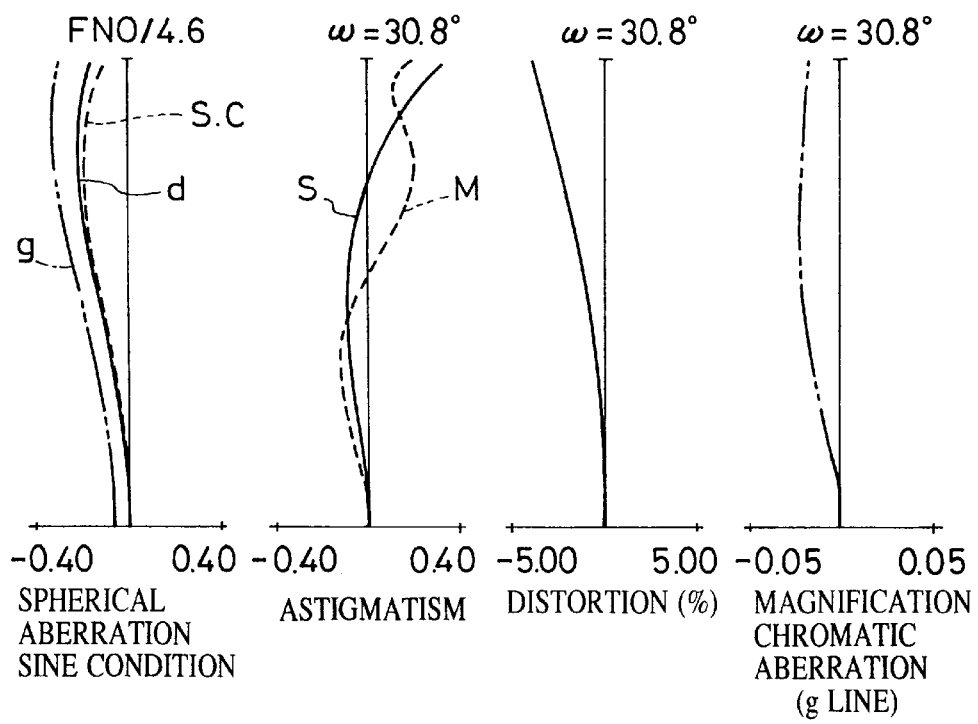
FIGS. 23A, 23B, 23C, and 23D illustrate diagrams showing the different aberrations at the wide angle end in Numerical Example 6 in accordance with the present invention.

In Numerical Example 7 of FIG. 7, the first lens unit comprises two lenses, a positive lens and a meniscus negative lens with its convex surface facing the object side. The second lens unit comprises two lenses, a biconcave negative lens and a meniscus positive lens with its convex surface facing the object side. The third lens unit comprises two lenses, a biconvex positive lens and a meniscus negative lens with its convex surface facing the image plane side. The fourth lens unit comprises one lens which is a meniscus positive lens with its convex surface facing the image plane side.

Accordingly, in the present invention, a predetermined magnification change-over ratio is obtained, and the entire lens system is reduced in size as a result of constructing the lens units in a particular manner. The first lens unit is reduced in size by constructing it out of two lenses with a predetermined shape. The second lens unit is constructed from two or three lenses with a predetermined shape in order to form the portion of the second lens unit on the optical axis thinner and reduce the size of the first lens unit.

More specifically, in general, the outer diameter of a lens unit can be made smaller by placing the lens unit closer to a stop. In the present invention, in order to reduce changes in the f-number which occur as magnification changes from the wide angle end to the telephoto end, the stop is placed away from the second lens unit and towards the image plane side, at the wide angle side. Constructing the second lens unit as described above and making the portion of the lens unit on the optical axis thinner decreases the distance between the first lens unit and the stop, thus decreasing the outer diameter of the first lens unit. A decrease in the outer diameter allows sufficient edge thickness to be provided for the positive lens in the first lens unit, resulting in an even thinner lens unit.

Formation of the third lens unit with a positive lens and a negative lens provides good optical performance because chromatic aberration produced by the positive lens is canceled by the negative lens.

When magnification changes from the wide angle end to the telephoto end, the stop is brought closer to the second lens unit; therefore placing the stop at the wide angle side away from the second lens unit and towards the image plane side is effective in further controlling changes in the f-number which occur as the magnification changes. Bringing the stop and the second lens unit closer together at the telephoto end makes it possible to control the on-axis light beams diverging from the second lens unit using a relatively small diameter stop, so that the f-number at the wide angle side is not set at a value causing too much brightness.

According to the present embodiment, the stop is disposed close to or within the third lens unit, whereby the first and fourth lens units are formed with proper outer diameters. In addition, the stop and the third lens unit are integrally moved when the magnification is being changed in order to simplify the lens barrel structure.

According to the present embodiment, when magnification is being changed, the distance between the third and fourth lens units is changed so that the non-axial light beams leaving the third lens unit passes the fourth lens unit at different heights at the wide angle end and at the telephoto end. Consequently, distortion is effectively corrected at the wide angle end and at the telephoto end. When magnification is being changed from the wide angle side to the telephoto side, the distance between the third and fourth lens units is decreased in order to correct distortion even more effectively.

According to the present embodiment, it is preferable that the fourth lens unit has a positive refractive power or a weak negative refractive power, whereby at the wide angle end sufficient back focus can be obtained. When the fourth lens unit has a very strong negative refractive power, the principle point of the entire lens system shifts toward the object side, thus making it difficult to obtain a sufficient back focus.

According to the present embodiment, the four lens units having the aforementioned refractive powers and constructions, are moved as described above when the magnification is being changed, and the refractive powers of the first and second lens units are set such that Conditions (1) and (2) are satisfied, respectively. Therefore, each of the lens units takes a proper part in changing the magnification, thereby making it easier to achieve high magnification changes and properly correct aberrations over the entire magnification change-over range.

A description will now be given of the technical meaning of aforementioned Conditions (1) and (2).

Condition (1) specifies the focal length of the first lens unit. When the upper limit is exceeded, the zoom lens device cannot function satisfactorily at the telephoto side, making it difficult to set the f-number of the zoom lens device at a value which provides brightness. When the focal length is less than the lower limit, it becomes difficult to correct spherical aberration and positive distortion at the telephoto side with a few lenses.

In the present embodiment, the optical performance of the zoom lens device is improved when the f1/fw value range of Condition (1) is limited to the f1/fw value range of Condition (1a):

$$1.9 < f1/fw < 3.0 \tag{1a}$$

Condition (2) specifies the focal length range of the second lens unit. When the upper limit is exceeded, it becomes difficult to continue performing high magnification changes. When the −f2/fw value is less than the lower limit, it becomes difficult to properly correct negative distortion at the wide angle side with a few lenses.

In the present embodiment, the optical performance of the zoom lens device is improved when the −f2/fw value range of Condition (2) is limited to the −f2/fw value range of Condition (2a):

$$0.44 < -f2/fw < 1.0 \tag{2a}$$

In the above-described embodiment, when the lens device is a zoom-type lens device whose lens units are properly constructed, the overall length of the lens system is reduced, with a wider angle of view at the wide angle end. In addition, the magnification change-over ratio can be set within a range of from about 2 to 3.5. Further aberration changes which occur as the magnification changes can be properly corrected, whereby high optical performance is provided over the entire magnification change-over range.

In the present embodiment, the optical performance of the zoom lens is improved, and the overall length thereof is decreased, when at least one of the following conditions is satisfied:

(A1) The third lens unit comprises a positive lens and a negative lens, and has an f3/fw value satisfying Condition (3):

$$0.5 < f3/fw < 2.0 \tag{3}$$

where f3 is the focal length of the third lens unit.

In the present invention, the various aberrations, particularly chromatic aberration, and the overall size of the lens system are reduced as a result of making the f3/fw value of the third lens unit satisfy Condition (3).

When the upper limit of Condition (3) is exceeded, the third lens unit must be moved by a larger amount during magnification changes, resulting in a larger overall size of the lens system. When the f3/fw value is less than the lower limit, it becomes difficult to properly correct, in particular, spherical aberration.

In the invention, it is preferable that the range of Condition (3) be limited to the range set in Condition (3a):

$$0.6 < f3/fw < 1.8 \tag{3a}$$

(A2) Condition (4) is satisfied:

$$f4/fw < 20 \tag{4}$$

where f4 is the focal length of the fourth lens unit.

When Condition (4) is satisfied, sufficient back focus is provided at the wide angle end, and negative distortion at the wide angle side is properly corrected.

It is preferable that the f4/fw value range of Condition (4) be limited to the value range set in Condition (4a):

$$1.2 < f4/fw < 20 \tag{4a}$$

When the fourth lens unit comprises one positive lens, it is preferable that the f4/fw value range of Condition (4) is limited to the value range set in Condition (4b) below:

$$3.0 < f4/fw < 20 \tag{4b}$$

(A3) The fourth lens unit comprises a positive lens, or two lenses, one of which is positive and the other of which is negative; in addition, the fourth lens unit has at least one surface thereof being aspherical.

When Condition (A3) is satisfied, the overall size of the lens system is reduced, and negative distortion at the wide angle end is properly and easily corrected.

(A4) The second lens unit is moved to focus an object.

In the lens construction of the present invention, the refractive power of the second lens unit is stronger than that of other lens units. Therefore, the use of the second lens unit to bring an object into focus reduces the amount of movement involved during focusing, thereby reducing the size of the lens-barrel structure. In addition, compared to the common focusing method in which the first lens unit is moved for focusing, this focusing method is advantageous in that the front lens diameter is smaller, and in that close-distance shooting is possible.

A description will now be given of the numerical examples of the present invention. In the numerical examples, Ri represents the radius of curvature of the ith lens surface from the object; Di represents the thickness of the ith lens in order of lenses from the object and the air gap; and Ni and vi represent the refractive index and the Abbe constant, respectively, of the ith lens in order of lenses from the object. Also, stop refers to stop SP and flare cutter refers to flare cut stop FP.

Table 8 gives the relationship between the above-described conditions and the numerical examples.

The aspherical shape is defined by the following formula:

$$X = \frac{(1/R)H^2}{1 + \sqrt{1 - (H/R)^2}} + AH^2 + BH^4 + CH^6 + DH^8 + EH^{10}$$

where the X-axis extends along the optical axis, the H-axis extends along a direction perpendicular to the optical axis, the direction of travel of light is defined as positive, R is the paraxial radius of curvature, and A, B, C, D, and E each represent aspherical coefficients. e-X represents $10^{-x}$.

(Numerical Example 1)

F = 28.90 ~ 77.18   FN0 = 4.60 ~ 5.88   2ω = 73.6° ~ 31.3°
R1 = 33.94     D1 = 1.50       N1 = 1.84665    ν 1 = 23.8
R2 = 25.51     D2 = 0.22
R3 = 26.03     D3 = 7.00       N2 = 1.69679    ν 2 = 55.5
R4 = 127.30    D4 = variable
R5 = 89.22     D5 = 1.10       N3 = 1.71299    ν 3 = 53.8
R6 = 10.93     D6 = 4.70
R7 = −107.83   D7 = 1.00       N4 = 1.71299    ν 4 = 53.8
R8 = 22.92     D8 = 0.12
R9 = 16.59     D9 = 3.05       N5 = 1.76182    ν 5 = 26.5
R10 = 93.07    D10 = variable
R11 = stop     D11 = 1.00
R12 = 15.64    D12 = 2.85      N6 = 1.66671    ν 6 = 48.3
R13 = −23.93   D13 = 0.03
R14 = −24.07   D14 = 1.00      N7 = 1.80518    ν 7 = 25.4
R15 = 65.66    D15 = 5.43
R16 = flare    D16 = variable
cutter
R17 = 20.57    D17 = 3.55      N8 = 1.67790    ν 8 = 55.3
R18 = −29.37   D18 = 0.12
R19 = −54.19   D19 = 1.20      N9 = 1.71999    ν 9 = 50.3
R20 = 25.73    D20 = variable

TABLE 1

| Focal length Variable Interval | 28.90 | 46.89 | 77.18 |
|---|---|---|---|
| D4 | 2.11 | 10.57 | 20.50 |
| D10 | 15.24 | 7.71 | 1.50 |
| D16 | 2.50 | 1.84 | 1.33 |
| D20 | 0.00 | 8.18 | 14.91 |

TABLE 1-continued

Aspherical surface coefficient   18th surface (R18)
A = 0   B = 9.156e − 05   C = 4.162e − 08   D = 0   E = 0

(Numerical Example 2)

F = 28.90 ~ 77.19   FN0 = 4.57 ~ 5.88   2ω = 73.6° ~ 31.3°
R1 = 36.17     D1 = 1.50       N1 = 1.84665    ν 1 = 23.8
R2 = 26.55     D2 = 0.18
R3 = 27.01     D3 = 6.70       N2 = 1.71299    ν 2 = 53.8
R4 = 134.87    D4 = variable
R5 = 108.06    D5 = 1.10       N3 = 1.71299    ν 3 = 53.8
R6 = 11.22     D6 = 4.73
R7 = −133.04   D7 = 1.00       N4 = 1.71299    ν 4 = 53.8
R8 = 25.37     D8 = 0.12
R9 = 16.87     D9 = 3.00       N5 = 1.76182    ν 5 = 26.5
R10 = 78.12    D10 = variable
R11 = stop     D11 = 0.50
R12 = 18.89    D12 = 3.15      N6 = 1.71999    ν 6 = 50.3
R13 = −18.17   D13 = 0.15
R14 = −17.41   D14 = 1.00      N7 = 1.78472    ν 7 = 25.7
R15 = −949.72  D15 = 4.88
R16 = flare    D16 = variable
cutter
R17 = −49.86   D17 = 1.50      N8 = 1.49171    ν 8 = 57.4
R18 = −29.09   D18 = variable

TABLE 2

| Focal length Variable Interval | 28.90 | 47.93 | 77.19 |
|---|---|---|---|
| D4 | 2.23 | 10.82 | 20.92 |
| D10 | 16.41 | 7.74 | 1.50 |
| D16 | 5.09 | 3.96 | 3.15 |
| D20 | 0.00 | 9.80 | 16.85 |

Aspherical surface coefficient   18th surface (R18)
A = 0   B = 6.365e − 05   C = 1.177e − 07   D = 5.752e − 09
E = −2.328e − 11

(Numerical Example 3)

F = 28.90 ~ 77.18   FN0 = 4.42 ~ 5.88   2ω = 73.6° ~ 31.3°
R1 = 36.31     D1 = 1.50       N1 = 1.84665    ν 1 = 23.8
R2 = 27.07     D2 = 0.16
R3 = 27.55     D3 = 6.30       N2 = 1.71299    ν 2 = 53.8
R4 = 136.34    D4 = variable
R5 = 99.37     D5 = 1.10       N3 = 1.71299    ν 3 = 53.8
R6 = 11.26     D6 = 5.52
R7 = −112.32   D7 = 1.00       N4 = 1.71299    ν 4 = 53.8
R8 = 24.51     D8 = 0.12
R9 = 17.19     D9 = 3.10       N5 = 1.76182    ν 5 = 26.5
R10 = 81.14    D10 = variable
R11 = stop     D11 = 0 50
R12 = 18.98    D12 = 3.25      N6 = 1.71999    ν 6 = 50.3
R13 = −17.39   D13 = 0.08
R14 = −16.95   D14 = 1.00      N7 = 1.78472    ν 7 = 25.7
R15 = −385.26  D15 = 4.36
R16 = flare    D16 = variable
cutter
R17 = −63.59   D17 = 2.00      N8 = 1.49171    ν 8 = 57.4
R18 = −32.42   D18 = variable

TABLE 3

| Focal length Variable Interval | 28.90 | 47.20 | 77.18 |
|---|---|---|---|
| D4 | 2.34 | 11.19 | 21.57 |
| D10 | 15.15 | 7.47 | 1.50 |
| D16 | 5.18 | 4.09 | 3.43 |
| D18 | 0.00 | 9.54 | 17.08 |

Aspherical surface coefficient  18th surface (R18)
A = 0   B = 6.434e − 05   C = 3.126e − 07   D = −2.118e − 09
E = 5.641e − 11

(Numerical Example 4)

F = 28.90 ~ 77.19   FN0 = 4.60 ~ 5.88   2ω = 73.6° ~ 31.3°

| | | | |
|---|---|---|---|
| R1 = 37.76 | D1 = 1.50 | N1 = 1.84665 | ν 1 = 23.8 |
| R2 = 29.12 | D2 = 0.22 | | |
| R3 = 29.85 | D3 = 6.20 | N2 = 1.69679 | ν 2 = 55.5 |
| R4 = 140.64 | D4 = variable | | |
| R5 = 103.86 | D5 = 1.10 | N3 = 1.69679 | ν 3 = 55.5 |
| R6 = 11.59 | D6 = 5.71 | | |
| R7 = −288.85 | D7 = 1.00 | N4 = 1.77249 | ν 4 = 49.6 |
| R8 = 24.66 | D8 = 0.2 | | |
| R9 = 17.41 | D9 = 3.00 | N5 = 1.80518 | ν 5 = 25.4 |
| R10 = 67.94 | D10 = variable | | |
| R11 = stop | D11 = 0.50 | | |
| R12 = 18.20 | D12 = 1.00 | N6 = 1.84665 | ν 6 = 23.8 |
| R13 = 10.59 | D13 = 0.15 | | |
| R14 = 10.82 | D14 = 3.20 | N7 = 1.69679 | ν 7 = 55.5 |
| R15 = −198.16 | D15 = 4.93 | | |
| R16 = flare cutter | D16 = variable | | |
| R17 = −26.41 | D17 = 2.00 | N8 = 1.49171 | ν 8 = 57.4 |
| R18 = −19.80 | D18 = variable | | |

TABLE 4

| Focal length Variable Interval | 28.90 | 47.98 | 77.19 |
|---|---|---|---|
| D4 | 2.54 | 12.17 | 23.46 |
| D10 | 16.44 | 7.64 | 1.50 |
| D16 | 6.72 | 5.37 | 4.55 |
| D18 | 0.00 | 10.36 | 17.58 |

Aspherical surface coefficient  18th surface (R18)
A = 0   B = 4.908e − 05   C = 2.401e − 07   D = 1.049e − 09
E = 2.310e − 11

(Numerical Example 5)

F = 28.90 ~ 101.49   FN0 = 4.06 ~ 5.76   2ω = 73.6° ~ 24.1°

| | | | |
|---|---|---|---|
| R1 = 45.00 | D1 = 1.50 | N1 = 1.84665 | ν 1 = 23.8 |
| R2 = 32.33 | D2 = 0.29 | | |
| R3 = 33.32 | D3 = 7.40 | N2 = 1.71299 | ν 2 = 53.8 |
| R4 = 319.48 | D4 = variable | | |
| R5 = 66.32 | D5 = 1.10 | N3 = 1.69679 | ν 3 = 55.5 |
| R6 = 12.77 | D6 = 5.92 | | |
| R7 = −46.98 | D7 = 1.00 | N4 = 1.69679 | ν 4 = 55.5 |
| R8 = 28.07 | D8 = 0.12 | | |
| R9 = 21.09 | D9 = 2.70 | N5 = 1.84665 | ν 5 = 23.8 |
| R10 = 85.54 | D10 = variable | | |
| R11 = stop | D11 = 0.40 | | |
| R12 = 18.74 | D12 = 3.30 | N6 = 1.60311 | ν 6 = 60.7 |
| R13 = −34.45 | D13 = 1.25 | | |
| R14 = −25.89 | D14 = 1.00 | N7 = 1.84665 | ν 7 = 23.8 |
| R15 = −234.67 | D15 = 8.02 | | |
| R16 = flare cutter | D16 = variable | | |
| R17 = 28.60 | D17 = 4.10 | N8 = 1.67790 | ν 8 = 55.3 |
| R18 = −34.68 | D18 = 0.12 | | |
| R19 = −92.58 | D19 = 1.20 | N9 = 1.77249 | ν 9 = 49.6 |
| R20 = 44.71 | D20 = variable | | |

TABLE 5

| Focal length Variable Interval | 28.90 | 54.08 | 101.49 |
|---|---|---|---|
| D4 | 2.33 | 14.30 | 28.36 |
| D10 | 19.16 | 8.93 | 1.50 |
| D16 | 3.92 | 2.34 | 1.26 |
| D20 | 0.00 | 13.84 | 24.73 |

Aspherical surface coefficient  5th surface (R5)
A = 0   B = −3.606e − 06   C = −1.962e − 09   D = −1.383e − 11
E = 2.549e − 14
Aspherical surface coefficient  18th surface (R18)
A = 0   B = 4.417e − 05   C = 1.414e − 08   D = 1.060e − 11
E = 0

(Numerical Example 6)

F = 36.20 ~ 67.58   FN0 = 4.06 ~ 5.53   2ω = 61.7° ~ 35.5°

| | | | |
|---|---|---|---|
| R1 = 45.00 | D1 = 1.50 | N1 = 1.84665 | ν 1 = 23.8 |
| R2 = 30.18 | D2 = 0.15 | | |
| R3 = 29.72 | D3 = 6.00 | N2 = 1.69679 | ν 2 = 55.5 |
| R4 = 106.57 | D4 = variable | | |
| R5 = −228.24 | D5 = 1.10 | N3 = 1.69679 | ν 3 = 55.5 |
| R6 = 11.38 | D6 = 3.56 | | |
| R7 = 18.69 | D7 = 3.10 | N4 = 1.58306 | ν 4 = 30.2 |
| R8 = 41.35 | D8 = variable | | |
| R9 = stop | D9 = 0.50 | | |
| R10 = 18.10 | D10 = 3.50 | N5 = 1.69679 | ν 5 = 55.5 |
| R11 = −32.69 | D11 = 2.05 | | |
| R12 = −22.25 | D12 = 1.00 | N6 = 1.84665 | ν 6 = 23.8 |
| R13 = −77.32 | D13 = 1.18 | | |
| R14 = flare cutter | D14 = variable | | |
| R15 = −40.1.0 | D15 = 2.00 | N7 = 1.49170 | ν 7 = 57.4 |
| R16 = −32.80 | D16 = variable | | |

TABLE 6

| Focal length Variable Interval | 36.20 | 48.66 | 67.58 |
|---|---|---|---|
| D4 | 5.31 | 12.81 | 20.70 |
| D8 | 15.66 | 10.33 | 4.98 |
| D14 | 6.59 | 5.94 | 5.62 |
| D16 | 0.00 | 5.01 | 10.46 |

Aspherical surface coefficient  8th surface (R8)
A = 0   B = −4.604e − 05   C = −4.013e − 08   D = 2.221e − 09
E = 0
Aspherical surface coefficient  16th surface (R16)
A = 0   B = 7.417e − 05   C = 2.433e − 07   D = −2.215e − 09
E = 0

(Numerical Example 7)

F = 36.20 ~ 67.59   FN0 = 4.60 ~ 5.62   2ω = 61.7° ~ 35.5°

| | | | |
|---|---|---|---|
| R1 = 42.42 | D1 = 5.50 | N1 = 1.69679 | ν1 = 55.5 |
| R2 = 1137.89 | D2 = 0.10 | | |
| R3 = 497.78 | D3 = 1.50 | N2 = 1.84665 | ν2 = 23.8 |
| R4 = 101.62 | D4 = variable | | |
| R5 = −198.04 | D5 = 1.10 | N3 = 1.69679 | ν3 = 55.5 |
| R6 = 11.81 | D6 = 3.45 | | |

-continued (Numerical Example 7)

| | | | |
|---|---|---|---|
| R7 = 19.09 | D7 = 3.10 | N4 = 1.58306 | ν4 = 30.2 |
| R8 = 45.30 | D8 = Variable | | |
| R9 = stop | D9 = 0.50 | | |
| R10 = 17.65 | D10 = 3.50 | N5 = 1.69679 | ν5 = 55.5 |
| R11 = −34.72 | D11 = 2.74 | | |
| R12 = −21.40 | D12 = 1.00 | N6 = 1.84665 | ν6 = 23.8 |
| R13 = −99.52 | D13 = 1.38 | | |
| R14 = flare cutter | D14 = variable | | |
| R15 = −49.01 | D15 = 2.00 | N7 = 1.49171 | ν7 = 57.4 |
| R16 = −30.52 | D16 = variable | | |

TABLE 7

| Focal length Variable Interval | 36.20 | 48.98 | 67.59 |
|---|---|---|---|
| D4 | 5.50 | 13.81 | 22.25 |
| D8 | 15.51 | 9.89 | 4.62 |
| D14 | 5.41 | 4.91 | 4.61 |
| D16 | 0.00 | 5.28 | 11.20 |

Aspherical surface coefficient 8th surface (R8)
A = 0  B = −3.917e − 05  C = −3.860e − 08  D = −1.616e − 09
E = 0
Aspherical surface coefficient 16th surface (R16)
A = 0  B = 7.447e − 05  C = 2.276e − 07  D = 2.956e − 09
E = 0

TABLE 8

| | Numerical Examples | | | | | | |
|---|---|---|---|---|---|---|---|
| Condition | 1 | 2 | 3 | 4 | 5 | 6 | 7 |
| (1) f1/fw | 2.517 | 2.614 | 2.610 | 2.824 | 2.866 | 2.529 | 2.850 |
| (2) −f2/fw | 0.610 | 0.639 | 0.611 | 0.655 | 0.623 | 0.627 | 0.662 |
| (3) f3/fw | 1.309 | 1.010 | 0.974 | 0.992 | 1.499 | 0.763 | 0.808 |
| (4) f4/fw | 2.02 | 4.09 | 4.56 | 5.07 | 1.87 | 9.29 | 4.39 |

As can be understood from the foregoing description, the zoom lens device comprises a total of four lens units which are properly constructed, so that the magnification change-over ratio is about 2 to 3.5, the shooting angle of view is wide at 60 to 75 degrees, the overall length of the lens system is reduced, and excellent optical performance is achieved over the entire magnification change-over range.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens device comprising in order of lens units, from object side to image side:
   a first lens unit having a positive refractive power, said first lens unit comprising a positive lens and a negative lens;
   a second lens unit having a negative refractive power, said second lens unit comprising one or two negative lenses and a positive lens;
   a third lens unit having a positive refractive power, said third lens unit comprising a positive lens and a negative lens; and
   a fourth lens unit having either a positive or negative refractive power,
   wherein said zoom lens device further comprises a stop disposed between said second lens unit and said fourth lens unit,
   wherein when magnification is being changed from a wide angle end to a telephoto end, said first lens unit, said third lens unit, and said fourth lens unit are moved toward the object side such that the distance between said first lens unit and said second lens unit increases, the distance between said second lens unit and said third lens unit decreases, and the distance between said third lens unit and said fourth lens unit changes,
   wherein the following conditions are satisfied:

$1.5 < f1/fw < 4.5$ $0.4 < -f2/fw < 1.2$ where f1 is the focal length of said first lens unit, f2 is the focal length of said second lens unit, and fw is the focal length at the wide angle end of the entire lens system, and
   wherein at least one of the conditions (a) that said first lens unit has only two lenses, (b) that said second lens unit has only two or three lenses, (c) that said third lens unit has only two lenses, and (d) that said fourth lens unit has only one lens, is satisfied.

2. A zoom lens device according to claim 1, wherein said second lens unit is moved to focus on an object.

3. A zoom lens device according to claim 1, wherein said third lens unit satisfies the following condition:

$0.5 < f3/fw < 2.0$ wherein f3 is the focal length of said third lens unit.

4. A zoom lens device according to claim 1, wherein said fourth lens unit comprises one of (i) a positive lens and (ii) a positive and a negative lens, and wherein said fourth lens unit has at least one aspherical surface.

5. A zoom lens device according to claim 1, wherein said first lens unit comprises a meniscus negative lens and a meniscus positive lens, each having its convex surface facing the object side.

6. A zoom lens device according to claim 1, wherein said second lens unit comprises a meniscus negative lens having its convex surface facing the object side, a biconcave negative lens, and a meniscus positive lens having its convex surface facing the object side.

7. A zoom lens device according to claim 1, wherein said third lens unit comprises a biconvex positive lens and a negative lens.

8. A zoom lens device according to claim 1, wherein said third lens unit comprises a meniscus negative lens with its convex surface facing the object side and a positive lens.

9. A zoom lens device according to claim 1, wherein said fourth lens unit comprises a meniscus positive lens having its convex surface facing the object side.

10. A zoom lens device according to claim 1, wherein said fourth lens unit comprises a biconvex positive lens and a biconcave negative lens.

11. A zoom lens device according to claim 1, wherein said second lens unit comprises a biconcave negative lens and a meniscus positive lens with its convex surface facing the object side.

12. A zoom lens device according to claim 1, wherein said third lens unit comprises a biconvex positive lens and a meniscus negative lens with its convex surface facing the image side.

13. A zoom lens device according to claim 1, wherein said fourth lens unit comprises a meniscus positive lens having its convex surface facing the image side.

14. A zoom lens device according to claim 1, wherein said first lens unit comprises a positive lens and a meniscus negative lens with its convex surface facing the object side.

15. A zoom lens device according to claim 1, wherein said stop is disposed on the object side of said third lens unit.

16. A zoom lens device according to claim 1, wherein said stop moves integrally with said third lens unit.

17. A zoom lens device according to claim 1, further comprising a flare cut stop disposed between said third lens unit and said fourth lens unit, wherein said stop and said flare cut stop move integrally with said third lens unit.

18. A zoom lens device according to claim 1, wherein when magnification is being changed from the wide angle end to the telephoto end, the distance between said third lens unit and said fourth lens unit decreases.

19. A zoom lens device according to claim 1, wherein said fourth lens unit has a positive refractive power.

20. A zoom lens device according to claim 1, wherein said first lens unit satisfies the following condition:

$$1.9 < f1/fw < 3.0.$$

21. A zoom lens device according to claim 1, wherein said second lens unit satisfies the following condition:

$$0.44 < -f2/fw < 1.0.$$

22. A zoom lens device according to claim 1, wherein said third lens unit satisfies the following condition:

$$0.6 < f3/fw < 1.8.$$

23. A zoom lens device according to claim 1, wherein said fourth lens unit satisfies the following condition:

$$f4/fw < 20$$

where f4 is the focal length of said fourth lens unit.

24. A zoom lens device according to claim 23, wherein said fourth lens unit satisfies the following condition:

$$1.2 < f4/fw < 20.$$

25. A zoom lens device according to claim 24, wherein said fourth lens unit satisfies the following condition:

$$3.0 < f4/fw < 20.$$

26. A zoom lens device according to claim 1, wherein said first lens unit has only two lenses.

27. A zoom lens device according to claim 1, wherein said second lens unit has only two or three lenses.

28. A zoom lens device according to claim 27, wherein said second lens unit has only two lenses.

29. A zoom lens device according to claim 1, wherein said third lens unit has only two lenses.

30. A zoom lens device according to claim 1, wherein said fourth lens unit has only one lens.

31. A zoom lens device according to claim 26, wherein in said first lens unit, said meniscus negative lens and said meniscus positive lens are arranged in that order from object side to image side.

32. A zoom lens device according to claim 26, wherein in said first lens unit, said meniscus positive lens and said meniscus negative lens are arranged in that order from object side to image side.

33. A zoom lens device comprising in order of lens units, from object side to image side:

a first lens unit having a positive refractive power, said first lens unit comprising a meniscus positive lens and a meniscus negative lens with their convex surfaces facing the object side;

a second lens unit having a negative refractive power, said second lens unit comprising a meniscus negative lens having its convex surface facing the object side, a biconcave negative lens, and a meniscus positive lens having its convex surface facing the object side;

a third lens unit having a positive refractive power, said third lens unit comprising one of (i) a biconvex positive lens and a negative lens and (ii) a meniscus negative lens with its convex surface facing the object side and a positive lens; and a fourth lens unit having either a positive or negative refractive power and comprising one of (i) a meniscus positive lens having its convex surface facing the image side and (ii) a biconvex positive lens and a biconcave negative lens, wherein said zoom lens device further comprises a stop disposed between said second lens unit and said fourth lens unit, wherein when magnification is being changed from a wide angle end to a telephoto end, said first lens unit, said third lens unit, and said fourth lens unit are moved toward the object side such that the distance between said first lens unit and said second lens unit increases, the distance between said second lens unit and said third lens unit decreases, and the distance between said third lens unit and said fourth lens unit changes, wherein the following conditions are satisfied:

$$1.5 < f1/fw < 4.5$$
$$0.4 < -f2/fw < 1.2$$

where f1 is the focal length of said first lens unit, f2 is the focal length of said second lens unit, and fw is the focal length at the wide angle end of the entire lens system, and wherein at least one of the conditions (a) that said first lens unit has only two lenses, (b) that said second lens unit has only three lenses, (c) that said third lens unit has only two lenses, and (d) that said fourth lens unit has only one lens, is satisfied.

34. A zoom lens device according to claim 33, wherein said first lens unit consists of two lenses, said second lens unit consists of three lenses, said third lens unit consists of two lenses, and said fourth lens unit consists of one or two lenses.

35. A zoom lens device according to claim 33, wherein said first lens unit has only two lenses.

36. A zoom lens device according to claim 33, wherein said second lens unit has only three lenses.

37. A zoom lens device according to claim 33; wherein said third lens unit has only two lenses.

38. A zoom lens device according to claim 33, wherein said fourth lens unit has only one lens.

39. A zoom lens device comprising in order of lens units, from object side to image side:
  a first lens unit having a positive refractive power, said first lens unit comprising a meniscus negative lens and a meniscus positive lens having their convex surfaces facing the object side;
  a second lens unit having a negative refractive power, said second lens unit comprising a biconcave negative lens and a meniscus positive lens having its convex surface facing the object side;
  a third lens unit having a positive refractive power, said third lens unit comprising a biconvex positive lens and a meniscus negative lens with its convex surface facing the image side; and
  a fourth lens unit comprising a meniscus positive lens having its convex surface facing the image side,
  wherein said zoom lens device further comprises a stop disposed between said second lens unit and said fourth lens unit,
  wherein when magnification is being changed from a wide angle end to a telephoto end, said first lens unit, said third lens unit, and said fourth lens unit are moved toward the object side such that the distance between said first lens unit and said second lens unit increases, the distance between said second lens unit and said third lens unit decreases, and the distance between said third lens unit and said fourth lens unit changes,
  wherein the following conditions are satisfied:

$$1.5 < f1/fw < 4.5$$
  $$0.4 < -f2/fw < 1.2$$

where f1 is the focal length of said first lens unit, f2 is the focal length of said second lens unit, and fw is the focal length at the wide angle end of the entire lens system, and
  wherein at least one of the conditions (a) that said first lens unit has only two lenses, (b) that said second lens unit has only two lenses, (c) that said third lens unit has only two lenses, and (d) that said fourth lens unit has only one lens, is satisfied.

40. A zoom lens device according to claim 39, wherein said first lens unit consists of two lenses, said second lens unit consists of two lenses, said third lens unit consists of two lenses, and said fourth lens unit consists of one lens.

41. A zoom lens device according to claim 39, wherein said first lens unit has only two lenses.

42. A zoom lens device according to claim 41, wherein said second lens unit has only two lenses.

43. A zoom lens device according to claim 39, wherein said third lens unit has only two lenses.

44. A zoom lens device according to claim 39, wherein said fourth lens unit has only one lens.

45. A zoom lens device comprising in order of lens units, from object side to image side:
  a first lens unit having a positive refractive power, said first lens unit comprising a positive lens and a meniscus negative lens with its convex surface facing the object side;
  a second lens unit having a negative refractive power, said second lens unit comprising a biconcave negative lens and a meniscus positive lens having its convex surface facing the object side;
  a third lens unit having a positive refractive power, said third lens unit comprising a biconvex positive lens and a meniscus negative lens with its convex surface facing the image side; and
  a fourth lens unit comprising a meniscus positive lens having its convex surface facing the image side,
  wherein said zoom lens device further comprises a stop disposed between said second lens unit and said fourth lens unit,
  wherein when magnification is being changed from a wide angle end to a telephoto end, said first lens unit, said third lens unit, and said fourth lens unit are moved toward the object side such that the distance between said first lens unit and said second lens unit increases, the distance between said second lens unit and said third lens unit decreases, and the distance between said third lens unit and said fourth lens unit changes,
  wherein the following conditions are satisfied:

$$1.5 < f1/fw < 4.5$$
  $$0.4 < -f2/fw < 1.2$$

where f1 is the focal length of said first lens unit, f2 is the focal length of said second lens unit, and fw is the focal length at the wide angle end of the entire lens system, and
  wherein at least one of the conditions (a) that said first lens unit has only two lenses, (b) that said second lens unit has only two lenses, (c) that said third lens unit has only two lenses, and (d) that said fourth lens unit has only one lens, is satisfied.

46. A zoom lens device according to claim 45, wherein said first lens unit consists of two lenses, said second lens unit consists of two lenses, said third lens unit consists of two lenses, and said fourth lens unit consists of one lens.

47. A zoom lens device according to claims 33, 39, or 45, wherein said second lens unit is moved to focus on an object.

48. A zoom lens device according to claims 33, 39, or 45, wherein said first lens unit satisfies the following condition:

$$1.9 < f1/fw < 3.0.$$

49. A zoom lens device according to claims 33, 39, or 45, wherein said second lens unit satisfies the following condition:

$$0.44 < -f2/fw < 1.0.$$

50. A zoom lens device according to claims 33, 39, or 45, wherein said third lens unit satisfies the following condition:

$$0.6 < f3/fw < 1.8.$$

51. A zoom lens device according to claims 33, 39, or 45, wherein said fourth lens unit satisfies the following condition:

$$f4/fw < 20$$

where f4 is the focal length of said fourth lens unit.

52. A zoom lens device according to claim 51, wherein said fourth lens unit satisfies the following condition:

$$1.2 < f4/fw < 20.$$

53. A zoom lens device according to claim 52, wherein said fourth lens unit satisfies the following condition:

$$3.0 < f4/fw < 20.$$

54. A zoom lens device according to claim 45, wherein said first lens unit has only two lenses.

55. A zoom lens device according to claim 45, wherein said second lens unit has only two lenses.

56. A zoom lens device according to claim 45, wherein said third lens unit has only two lenses.

57. A zoom lens device according to claim 45, wherein said fourth lens unit has only one lens.

* * * * *

UNITED STATES PATENT AND TRADEMARK OFFICE
CERTIFICATE OF CORRECTION

PATENT NO. : 5,829,729
DATED : January 12, 1999
INVENTOR(S) : Makoto Misaka

It is certified that error appears in the above-identified patent and that said Letters Patent is hereby corrected as shown below:

<u>Title page, Item [54] and Column 1, line 2,</u>
Title, "UNIT" should read -- UNITS --.

<u>Column 13,</u>
Line 27, (Numerical Example 4), "ν5 = 25 4" should read -- ν5 = 25.4 --.

<u>Column 14,</u>
Line 27, (Numerical Example 6), "4.06" should read -- 4.60 --;
Line 28, (Numerical Example 6), "R1=45.00" should read -- R1=39.45 --; and
Line 40, (Numerical Example 6), "R15=-40.1.0" should read -- R`5=-40.10 --.

<u>Column 18,</u>
Line 66, "claim 33;" should read -- claim 33, --.

<u>Column 19,</u>
Line 51, "claim 41," should read -- claim 39, --.

Signed and Sealed this

Thirtieth Day of July, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 5,859,729        Page 1 of 1
DATED : January 12, 1999
INVENTOR(S) : Makoto Misaka It is certified that error appears in the above-identified patent and that said Letters Patent is hereby corrected as shown below:

Title page, Item [54] and Column 1, line 2,
Title, "UNIT" should read -- UNITS --.

Column 13,
Line 27, (Numerical Example 4), "$\nu 5 = 25\ 4$" should read -- $\nu 5 = 25.4$ --.

Column 14,
Line 27, (Numerical Example 6), "4.06" should read -- 4.60 --;
Line 28, (Numerical Example 6), "R1=45.00" should read -- R1=39.45 --; and
Line 40, (Numerical Example 6), "R15=-40.1.0" should read -- R15=-40.10 --.

Column 18,
Line 66, "claim 33;" should read -- claim 33, --.

Column 19,
Line 51, "claim 41," should read -- claim 39, --.

Signed and Sealed this

Sixteenth Day of September, 2003

JAMES E. ROGAN
*Director of the United States Patent and Trademark Office*